United States Patent
Abe

(10) Patent No.: US 11,942,991 B2
(45) Date of Patent: Mar. 26, 2024

(54) OPTICAL SUBMARINE BRANCHING APPARATUS, OPTICAL SUBMARINE CABLE SYSTEM, SWITCHING METHOD, NON-TRANSITORY COMPUTER-READABLE MEDIUM

(71) Applicant: NEC Corporation, Tokyo (JP)

(72) Inventor: Ryota Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 60 days.

(21) Appl. No.: 17/439,914

(22) PCT Filed: Nov. 12, 2019

(86) PCT No.: PCT/JP2019/044251
§ 371 (c)(1),
(2) Date: Sep. 16, 2021

(87) PCT Pub. No.: WO2020/194842
PCT Pub. Date: Oct. 1, 2020

(65) Prior Publication Data
US 2022/0286203 A1    Sep. 8, 2022

(30) Foreign Application Priority Data
Mar. 27, 2019   (JP) ................. 2019-061901

(51) Int. Cl.
*H04B 10/80* (2013.01)
*H04B 10/25* (2013.01)
*H04Q 11/00* (2006.01)

(52) U.S. Cl.
CPC ......... *H04B 10/25* (2013.01); *H04Q 11/0005* (2013.01); *H04Q 2011/0037* (2013.01)

(58) Field of Classification Search
CPC ............................ H04B 10/80; H04J 14/0201
See application file for complete search history.

(56) References Cited

U.S. PATENT DOCUMENTS 10,771,179 B1 *   9/2020   Marcenac ........ H04B 10/25891
2002/0057477 A1   5/2002   Rocca et al.
(Continued)

FOREIGN PATENT DOCUMENTS

| CN | 102934377 A | 2/2013 |
| CN | 104518828 A | 4/2015 |

(Continued)

OTHER PUBLICATIONS

International Search Report for PCT Application No. PCT/JP2019/044251, dated Dec. 24, 2019.

(Continued)

*Primary Examiner* — Shi K Li
(74) *Attorney, Agent, or Firm* — Sughrue Mion, PLLC

(57) ABSTRACT

An optical submarine branching apparatus 1 includes a control unit and a switching unit. The switching unit connects to a plurality of first optical fiber transmission lines connecting to a first terminal station, a plurality of second optical fiber transmission lines connecting to a second terminal station, and a third optical fiber transmission line connecting to a third terminal station, and switches a transmission route of a wavelength-multiplexed optical signal. The control unit controls the switching of the transmission route by the switching unit. The switching unit is configured to be capable of connecting each of the plurality of first optical fiber transmission lines to one of the plurality of second optical fiber transmission lines. The switching unit further is configured to be capable of switching any one of the plurality of first optical fiber transmission lines to connect to the third optical fiber transmission line.

15 Claims, 20 Drawing Sheets

(56) References Cited

U.S. PATENT DOCUMENTS

| | | | |
|---|---|---|---|
| 2002/0191899 A1* | 12/2002 | Kelly | H04J 14/0213 385/24 |
| 2013/0315591 A1 | 11/2013 | Inoue | |
| 2016/0301467 A1 | 10/2016 | Ji et al. | |
| 2018/0070156 A1 | 3/2018 | Kawai | |
| 2018/0219619 A1* | 8/2018 | Takigawa | H04J 14/0297 |
| 2019/0081701 A1* | 3/2019 | Oda | H04L 1/20 |
| 2019/0371007 A1* | 12/2019 | Elgersma | G06T 17/05 |
| 2020/0033542 A1* | 1/2020 | Garrett | H04J 14/0221 |

FOREIGN PATENT DOCUMENTS

| | | | |
|---|---|---|---|
| CN | 108886401 A | 11/2018 | |
| EP | 3605890 A1 | 2/2020 | |
| JP | H09-289488 A | 11/1997 | |
| JP | H10-150409 A | 6/1998 | |
| JP | 2017-157985 A | 9/2017 | |
| WO | 2012/132688 A1 | 10/2012 | |
| WO | 2016/152115 A1 | 9/2016 | |
| WO | WO-2017022231 A1 * | 2/2017 | H04B 10/03 |

OTHER PUBLICATIONS

Extended European Search Report for EP Application No. EP19921814.0 dated Apr. 8, 2022.

Garrett Lara D: "Evolution of Reconfigurable Submarine Fiberoptic Networks", 2019 24th Optoelectronics and Communications Conference (OECC) and 2019 International Conference on Photonics in Switching and Computing (PSC), Jul. 7, 2019.

CN Office Communication for CN Application No. 201980094570.2, dated Nov. 3, 2023 with English Translation.

* cited by examiner

OPTICAL SUBMARINE BRANCHING APPARATUS, OPTICAL SUBMARINE CABLE SYSTEM, SWITCHING METHOD, NON-TRANSITORY COMPUTER-READABLE MEDIUM

This application is a National Stage Entry of PCT/JP2019/044251 filed on Nov. 12, 2019, which claims priority from Japanese Patent Application 2019-061901 filed on Mar. 27, 2019, the contents of all of which are incorporated herein by reference, in their entirety.

TECHNICAL FIELD

The present disclosure relates to an optical submarine branching apparatus, an optical submarine cable system, a switching method, and a program.

BACKGROUND ART

In an optical submarine cable system, optical transmission apparatuses installed in land terminal stations transmit wavelength-multiplexed optical signals to each other via an optical submarine cable. An optical submarine cable system connecting a first terminal station and a second terminal station can also be configured such that an optical submarine branching apparatus is installed in the middle of an optical submarine cable and a third terminal station is connected to the optical submarine branching apparatus via an optical submarine cable. This configuration enables the first terminal station or the second terminal station to perform optical communication with the third terminal station.

In Patent Literature 1, a branching apparatus (optical submarine branching apparatus) that is interposed in a main transmission line connecting transmission terminal station apparatuses is described. In the branching apparatus described in Patent Literature 1, a wavelength-multiplexed optical signal having been transmitted through the main transmission line is separated into optical signals of respective wavelengths, and transmission directions of the separated optical signals are switched between the main transmission line and a branch transmission line to a branch station.

In Patent Literature 2, a branching apparatus (optical submarine branching apparatus) that branches an optical fiber pair connecting a first site and a second site to a third site is described. In the branching apparatus described in Patent Literature 2, when a malfunction occurs in a branch transmission system including a branched fiber pair, the first site and the second site are directly connected to each other without branching to the third site, based on a control signal transmitted through the main transmission line by use of a wavelength outside a band for transmission signals.

CITATION LIST

Patent Literature

Patent Literature 1: Japanese Unexamined Patent Application Publication No. H09-289488
Patent Literature 2: Japanese Unexamined Patent Application Publication No. H10-150409

SUMMARY OF INVENTION

Technical Problem

In a general optical submarine cable system, in order to cope with increase in the amount of transmission and the like, a transmission line other than a main transmission line can be installed, that is, terminal stations can be connected using a plurality of optical fiber transmission lines. It is also desirable to interpose an optical submarine branching apparatus in such a system, and, further, it is desirable to enable the optical submarine branching apparatus to branch a specified transmission line among a plurality of optical fiber transmission lines to a branch station without increasing the number of constituent elements between the optical submarine branching apparatus and the branch station to the extent possible. Note that, in the technologies described in Patent Literatures 1 and 2, branching a transmission line other than the main transmission line to a branch station, that is, connecting a transmission line other than the main transmission line to a branch transmission line, is not supposed.

An object of the present disclosure is to provide an optical submarine branching apparatus, an optical submarine cable system, a switching method, and a program that solve the above-described problem. The above-described problem is to, in an optical submarine cable system in which terminal stations are connected by a plurality of optical fiber transmission lines, connect a specified optical fiber transmission line to an optical fiber transmission line for branching, without increasing the number of constituent elements between an optical submarine branching apparatus and a branch station to the extent possible.

Solution to Problem

An optical submarine branching apparatus according to a first aspect of the present disclosure includes a switching unit configured to connect to a plurality of first optical fiber transmission lines connecting to a first terminal station, a plurality of second optical fiber transmission lines connecting to a second terminal station, and a third optical fiber transmission line connecting to a third terminal station and switch a transmission route of a wavelength-multiplexed optical signal and a control unit configured to control switching of the transmission route by the switching unit, in which the switching unit includes a function of connecting each of the plurality of first optical fiber transmission lines to one of the plurality of second optical fiber transmission lines and a function of switching any one of the plurality of first optical fiber transmission lines to connect to the third optical fiber transmission line.

An optical submarine cable system according to a second aspect of the present disclosure includes a first terminal station, a second terminal station, a third terminal station, an optical submarine branching apparatus, a plurality of first optical fiber transmission lines configured to connect the optical submarine branching apparatus to the first terminal station, a plurality of second optical fiber transmission lines configured to connect the optical submarine branching apparatus to the second terminal station, and a third optical fiber transmission line configured to connect the optical submarine branching apparatus to the third terminal station, in which the optical submarine branching apparatus includes a switching unit configured to connect to the plurality of first optical fiber transmission lines, the plurality of second optical fiber transmission lines, and the third optical fiber transmission line and switch a transmission route of a wavelength-multiplexed optical signal and a control unit configured to control switching of the transmission route by the switching unit, and the switching unit includes a function of connecting each of the plurality of first optical fiber transmission lines to one of the plurality of second optical fiber transmission lines and a function of switching any one of the plurality of first optical fiber transmission lines to connect to the third optical fiber transmission line.

A switching method according to a third aspect of the present disclosure includes a control step of controlling a switching unit in an optical submarine branching apparatus, the switching unit being connected to a plurality of first optical fiber transmission lines connecting the optical submarine branching apparatus to a first terminal station, a plurality of second optical fiber transmission lines connecting the optical submarine branching apparatus to a second terminal station, and a third optical fiber transmission line connecting the optical submarine branching apparatus to a third terminal station, to switch a transmission route of a wavelength-multiplexed optical signal, in which the control step includes a step of connecting each of the plurality of first optical fiber transmission lines to one of the plurality of second optical fiber transmission lines and a step of switching any one of the plurality of first optical fiber transmission lines to connect to the third optical fiber transmission line.

A program according to a fourth aspect of the present disclosure is a program causing a control computer included in an optical submarine branching apparatus to execute a control step of controlling a switching unit in the optical submarine branching apparatus, the switching unit being connected to a plurality of first optical fiber transmission lines connecting the optical submarine branching apparatus to a first terminal station, a plurality of second optical fiber transmission lines connecting the optical submarine branching apparatus to a second terminal station, and a third optical fiber transmission line connecting the optical submarine branching apparatus to a third terminal station, to switch a transmission route of a wavelength-multiplexed optical signal to be executed, in which the control step includes a step of connecting each of the plurality of first optical fiber transmission lines to one of the plurality of second optical fiber transmission lines and a step of switching any one of the plurality of first optical fiber transmission lines to connect to the third optical fiber transmission line.

Advantageous Effects of Invention

The present disclosure enables an optical submarine branching apparatus, an optical submarine cable system, a switching method, and a program that solve the above-described problem to be provided. In other words, according to the present disclosure, it is possible to, in an optical submarine cable system in which terminal stations are connected by a plurality of optical fiber transmission lines, connect a specified optical fiber transmission line to an optical fiber transmission line for branching, without increasing the number of constituent elements between an optical submarine branching apparatus and a branch station to the extent possible.

DESCRIPTION OF EMBODIMENTS

Example embodiments will be described with reference to the drawings hereinbelow. Note that, in the example embodiments, the same signs are assigned to the same or equivalent elements and overlapping description thereof will sometimes be omitted. Although the drawings to be described hereinbelow include drawings in which unidirectional arrows are drawn, each of the arrows simply illustrates a direction of a flow of a signal (data) and does not rule out bidirectionality.

First Example Embodiment

Figure 1:
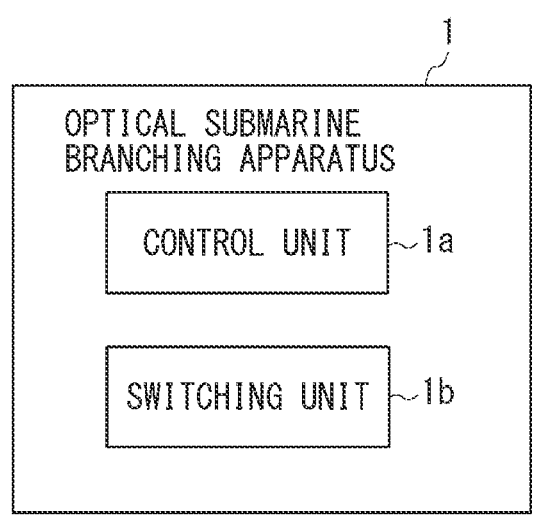
FIG. 1 is a block diagram illustrating a configuration example of an optical submarine branching apparatus according to a first example embodiment.

An optical submarine branching apparatus according to a first example embodiment and an optical submarine cable system including the optical submarine branching apparatus will be described referring to FIGS. 1 and 2. FIG. 1 is a block diagram illustrating a configuration example of the optical submarine branching apparatus according to the first example embodiment, and FIG. 2 is a schematic diagram illustrating a configuration example of the optical submarine cable system including the optical submarine branching apparatus.

As illustrated in FIG. 1, an optical submarine branching apparatus 1 according to the present example embodiment includes a control unit 1a and a switching unit 1b and can be used to branch optical communication between terminal stations to another terminal station (branch terminal station) side, that is, to distribute light to the branch terminal station side. The control unit 1a and the switching unit 1b will be described later.

Figure 2:
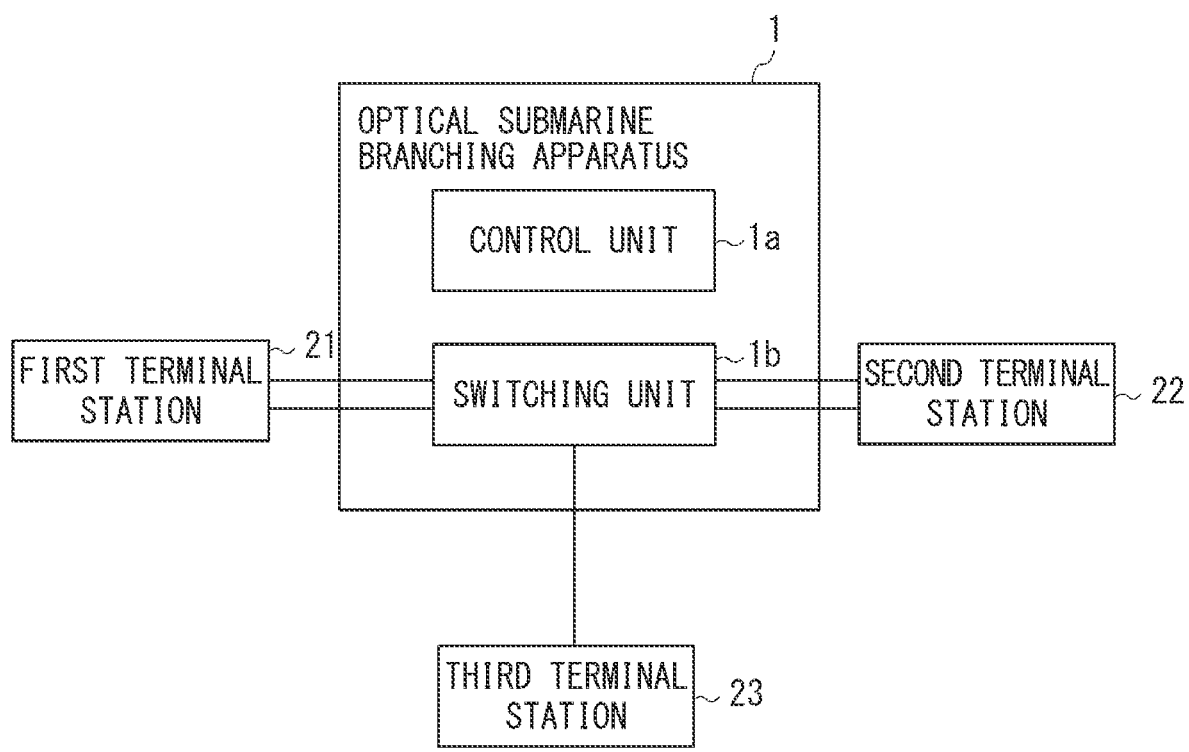
FIG. 2 is a schematic diagram illustrating a configuration example of an optical submarine cable system including the optical submarine branching apparatus in FIG. 1.

As illustrated in FIG. 2, the optical submarine branching apparatus 1 according to the present example embodiment can be connected to a first terminal station 21 via a plurality of optical fiber transmission lines (hereinafter, referred to as first optical fiber transmission lines) and connected to a second terminal station 22 via a plurality of optical fiber transmission lines (hereinafter, referred to as second optical fiber transmission lines). Further, the optical submarine branching apparatus 1 can be connected to a third terminal station 23 via an optical fiber transmission line (hereinafter, referred to as a third optical fiber transmission line).

The optical submarine branching apparatus 1, the first terminal station 21, the second terminal station 22, the third terminal station 23, and the optical fiber transmission lines connecting the apparatus and the terminal stations constitute the optical submarine cable system (hereinafter, referred to as the system) in the present example embodiment. Note that each terminal station can be installed on land and optical fiber transmission lines between each terminal station and the optical submarine branching apparatus 1 can be contained in a single optical cable and laid on the sea floor. For example, the first optical fiber transmission lines between the first terminal station 21 and the optical submarine branching apparatus 1 can be contained in a single optical cable and laid on the sea floor. The same applied to the second optical fiber transmission lines connected to the second terminal station 22 and the third optical fiber transmission lines connected to the third terminal station 23. Note, however, that the plurality of first optical fiber transmission lines can be divided into sets and contained in a plurality of optical cables, and the plurality of second optical fiber transmission lines can also be divided into sets and contained in a plurality of optical cables.

This system is an optical network system performing optical communication between terminal stations, and a wavelength division multiplexing (WDM) transmission method is employed for the optical communication. In other words, the system is a wavelength multiplexing optical transmission system in which a WDM transmission network performing single-fiber bidirectional communication is included. For example, installing an optical transmission apparatus including a multiplexer/demultiplexer or the like at each terminal station enables wavelength multiplexing communication between terminal stations via an optical fiber transmission line to be performed.

Respective constituent elements of the optical submarine branching apparatus 1 will be described.

The control unit 1a controls switching of a transmission route by the switching unit 1b. The control unit 1a can be configured as a part that performs control of the entire optical submarine branching apparatus 1 including switching control for the switching unit 1b. The control unit 1a is capable of performing the switching control in accordance with, for example, a control signal acquired from an optical fiber transmission line. Extracting an optical signal of a specific wavelength among wavelength-multiplexed signals from an optical fiber transmission line and converting the optical signal to an electrical signal enables such a control signal to be acquired.

The control unit 1a can be achieved by, for example, a central processing unit (CPU), a working memory, and a non-transitory storage device storing a program for controlling the entire optical submarine branching apparatus 1. In other words, the control unit 1a can include a control computer in which the program is incorporated in an executable manner. The control unit 1a can also be achieved using, for example, an integrated circuit.

The switching unit 1b connects to the plurality of first optical fiber transmission lines connecting to the first terminal station 21, the plurality of second optical fiber transmission lines connecting to the second terminal station 22, and the third optical fiber transmission line connecting to the third terminal station 23 and switches a transmission route of a wavelength-multiplexed optical signal. As described above, the switching unit 1b is configured to be able to switch a connection state in a transmission route in accordance with control from the control unit 1a In particular, the switching unit 1b includes a function of connecting each of the plurality of first optical fiber transmission lines to one of the plurality of second optical fiber transmission lines. This function is basically a function of connecting each of the plurality of first optical fiber transmission lines to preset one of the plurality of second optical fiber transmission lines. In other words, a correspondence relation between a first optical fiber transmission line and a second optical fiber transmission line to be connected to the first optical fiber transmission line can be determined in advance, and the first terminal station 21 and the second terminal station 22 can be connected with respect to each set of a first optical fiber transmission line and a second optical fiber transmission line corresponding to each other. The above-described set can be used as, for example, a single trunk line, and, in the system, the first terminal station 21 and the second terminal station 22 can be connected to each other, using a plurality of trunk lines. Note that it is possible to use each of the above-described sets for a different type of system, that is, an apparatus including a different function can be connected via a terminal station with respect to each set. Further, the third optical fiber transmission line can also be used for a system of a different type from systems usable through the above-described sets.

As one of the principal features of the present example embodiment, the switching unit 1b further includes a function of switching any one of the plurality of first optical fiber transmission lines to connect to the third optical fiber transmission line. The any one of the plurality of first optical fiber transmission lines can be indirectly specified by the control unit 1a controlling the switching of a transmission route by the switching unit 1b. Note that, in the following description including the other example embodiments, such indirect specification will sometimes also be described as a specification by a control unit.

In other words, the switching unit 1b includes a configuration capable of connecting any one of the plurality of first optical fiber transmission lines to the third optical fiber transmission line. The switching unit 1b is configured such that whether or not branching one of the above-described sets to the third optical fiber transmission line is controllable by the control unit 1a and, in the case of branching one of the above-described sets to the third optical fiber transmission line, to which one of the first optical fiber transmission lines the third optical fiber transmission line is to be connected is controllable by a specification from the control unit 1a. Note, however, that all of the plurality of first optical fiber transmission lines do not include to be included in the alternative optical fiber transmission lines to be branched and it is only required to be able to specify an optical fiber transmission line to be branched out of two or more first optical fiber transmission lines. Note that the third optical fiber transmission line can be used as, for example, a branch line to which the above-described trunk line is branched.

It is needless to say that the switching unit 1b can also include a function of, after such switching to the third terminal station 23 has been performed, restoring the connection to an original connection state, controlled by the control unit 1a. In other words, the switching unit 1b can include a function of switching each of the plurality of first optical fiber transmission lines to connect to one of the plurality of second optical fiber transmission lines.

According to the present example embodiment, in an optical submarine cable system in which terminal stations are connected by a plurality of optical fiber transmission lines, it is possible to branch a specified optical fiber transmission line to the third optical fiber transmission line for branching (to branch a specified optical fiber transmission line to a branch station). Therefore, in the system, it is also possible to branch an optical fiber transmission line to a third terminal station when optical communication is interrupted due to damage to an optical fiber in an optical submarine cable or a malfunction of a submarine apparatus, such as a repeater, that is installed in the middle of an optical submarine cable.

Further, according to the present example embodiment, such branching enables the number of constituent elements (such as a transmission line other than the third optical fiber transmission line) between the optical submarine branching apparatus 1 and a branch station to be prevented from increasing, to the extent possible. In other words, in the system, configuring the optical submarine branching apparatus 1 as described above enables the plurality of first optical fiber transmission lines to share the third optical fiber transmission line for a branch line. For example, according to the system, the system enables two or more trunk lines to share a single branch line. Thus, in the system, it is possible to reduce the number of the optical fiber transmission lines for branching (the number of optical fibers in the optical cable between the optical submarine branching apparatus 1 and the third terminal station 23). In addition, in the system, such capability of reducing the number of optical fiber transmission lines enables the number of submarine apparatuses, such as a repeater, that are installed for the purpose of amplifying optical signals to be reduced.

The switching method in the optical submarine branching apparatus 1 will be complemented below. The optical submarine branching apparatus 1 is capable of performing a switching method including the following control steps, as described in the switching processing thereof. The above-described control steps control the switching unit 1b in the optical submarine branching apparatus, which is connected to the plurality of first optical fiber transmission lines, the plurality of second optical fiber transmission lines, and the third optical fiber transmission line, to switch a transmission route of a wavelength-multiplexed optical signal. The above-described control steps include a step of connecting each of the plurality of first optical fiber transmission lines to one of the plurality of second optical fiber transmission lines. The above-described control steps further include a step of switching any one of the plurality of first optical fiber transmission lines to connect to the third optical fiber transmission line. In this configuration, the above-described control steps can include a step of accepting a specification specifying the any one of the plurality of first optical fiber transmission lines through extraction from an optical signal or the like. The other examples are as described above, and examples that will be described in example embodiments to be described later can also be applied.

A program that can be incorporated in the optical submarine branching apparatus 1 will be complemented below. A program incorporated in the above-described control unit 1a serves as a program causing a control computer included in the optical submarine branching apparatus 1 to perform the above-described control steps. The other examples are as described above, and examples that will be described in example embodiments to be described later can also be applied.

Second Example Embodiment

Figure 3:
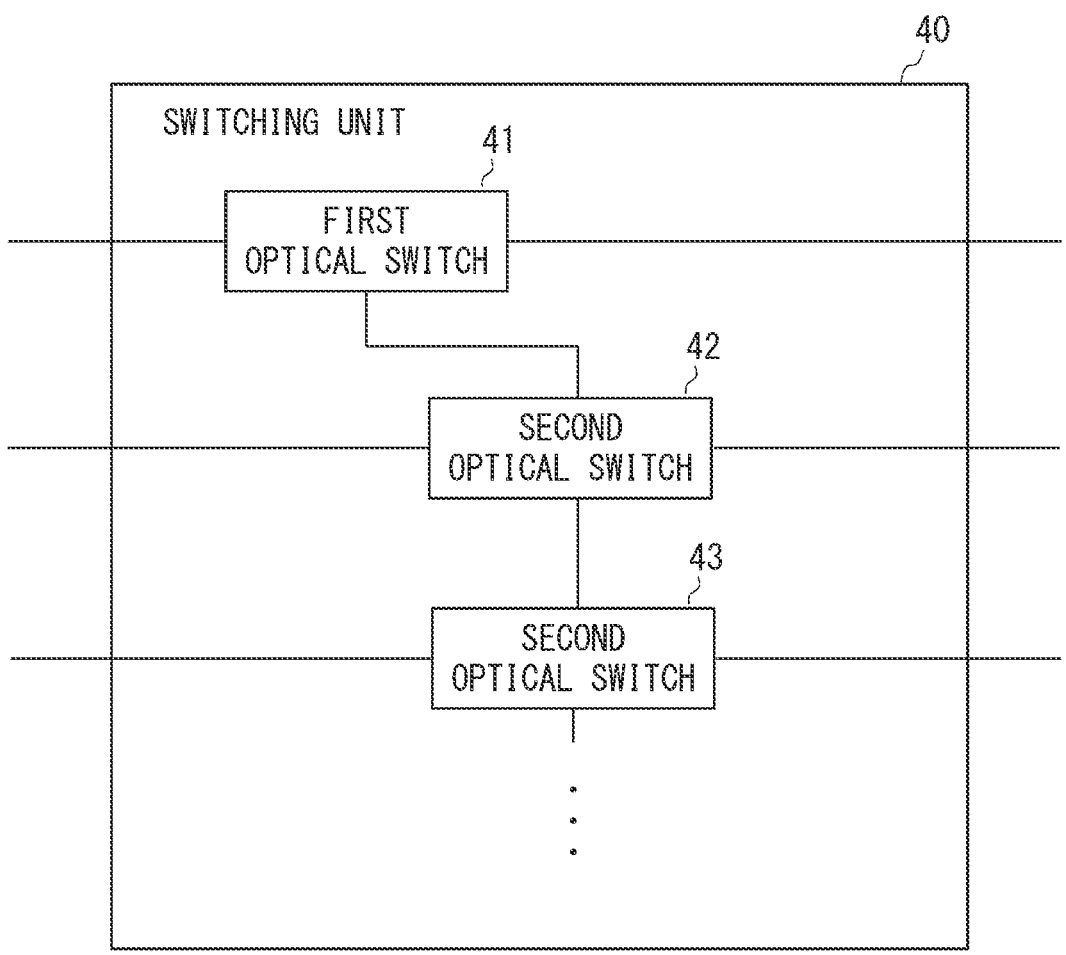
FIG. 3 is a diagram illustrating a configuration example of a switching unit included in an optical submarine branching apparatus according to a second example embodiment.

Although a second example embodiment will be described with additional reference to FIGS. 3 to 10, focusing on differences from the first example embodiment, various examples described in the first example embodiment are applicable. FIG. 3 is a diagram illustrating a configuration example of a switching unit included in an optical submarine branching apparatus according to the second example embodiment.

The optical submarine branching apparatus according to the present example embodiment is an optical submarine branching apparatus in which the switching unit 1b in the optical submarine branching apparatus 1 in FIG. 1 is configured into a switching unit 40 illustrated in FIG. 3, and, in the present example embodiment, the other parts will also be described referring to FIGS. 1 and 2.

As illustrated in FIG. 3, the switching unit 40 of an optical submarine branching apparatus 1 according to the present example embodiment can include a configuration in which a first optical switch 41 and second optical switches 42, 43, and so on are connected in multi-stages. A first optical switch, a second optical switch, and a third optical switch, which will be described later, are optical switches that include a difference from one another in at least either the number of inputs (the number of input paths) or the number of outputs (the number of output paths). Note that, without being limited to an example described in the present example embodiment, the switching unit can be configured by a combination of a plurality of optical switches.

The first optical switch 41 is an optical switch including an input path and two output paths. The second optical switch 42 is an optical switch including two input paths and two output paths. The second optical switch 43 includes the same configuration as that of the second optical switch 42, and the same applies to another second optical switch that is arranged at the succeeding stage (on the third terminal station 23 side). In the above description, the input and the output are only distinguished from each other for the purpose that the description is made assuming, for convenience, the first terminal station 21 side as the origin of information transmission, and the following description will also appropriately be made based on the origin of information transmission.

As described more specifically, the first optical switch 41 uses the first one of the first optical fiber transmission lines as input and uses the first one of the second optical fiber transmission lines and the second optical switch 42 as output, and is configured to be capable of switching the output to either of the output destinations. The second optical switch 42 uses the second one of the first optical fiber transmission lines and an output of the first optical switch 41 as input and uses the second one of the second optical fiber transmission lines and the second optical switch 43 as output, and is configured to be capable of switching the input to either of the input sources and switching the output to either of the output destinations. The second optical switch 43 uses the third one of the first optical fiber transmission lines and an output of the second optical switch 42 as input and uses the third one of the second optical fiber transmission lines and the another optical switch at the succeeding stage as output, and is configured to be capable of switching the input to either of the input sources and switching the output to either of the output destinations. Although description is omitted, the another second optical switch at the succeeding stage to the second optical switch 43 (on the third terminal station 23 side) includes the same connection configuration as that of the second optical switch 43, and each of the input and the output is selectable from two paths.

In such a configuration in which optical switches are arranged and connected in multi-stages, the number of first optical switches can be set at one as exemplified by the first optical switch 41. The number of second optical switches can be set at a number obtained by subtracting 1 from the number of the first optical fiber transmission lines that are provided in the system (when fiber pairs, which will be described later, are employed, a number twice the number of the fiber pairs). In other words, the second optical switch 43 and second optical switches at succeeding stages are disposed according to the number of the above-described sets, and, when the number of sets is, for example, two, such second optical switches do not include to be disposed. Note that the description is made targeting, as the above-described sets, a number of first optical fiber transmission lines that are included in the system and the description is also made under the assumption that all of the first optical fiber transmission lines belonging to the sets are transmission lines to be branched.

Figure 4:
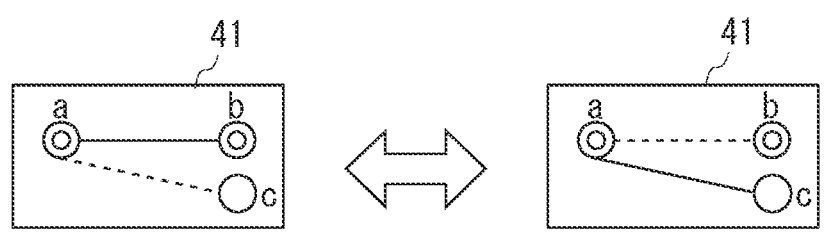
FIG. 4 is a diagram illustrating an example of a first optical switch in the switching unit in FIG. 3.
Figure 5:
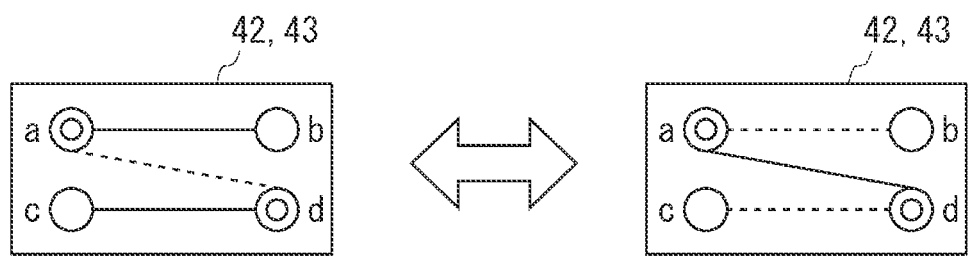
FIG. 5 is a diagram illustrating an example of a second optical switch in the switching unit in FIG. 3.

With reference to FIGS. 4 and 5, examples of the first optical switch and the second optical switch will be described below. FIG. 4 is a diagram illustrating an example of the first optical switch in the switching unit 40, and FIG. 5 is a diagram illustrating an example of the second optical switch in the switching unit 40. In FIGS. 4 and 5, a path that is in a connected state (a state in which light is transmitted) and a path that is in a non-connected state (a disconnected state) are illustrated by a solid line and a dashed line, respectively. Both states can be achieved by the control unit 1a controlling each optical switch to switch a transmission route.

The first optical switch 41 can internally include a terminal a, a terminal b, and a terminal c, as illustrated in FIG. 4 and use the terminal a as an input terminal and the terminal b and the terminal c as output terminals. The terminal a, the terminal b, and the terminal c can be connected to the first one of the first optical fiber transmission lines, the first one of the second optical fiber transmission lines, and an input terminal of the second optical switch 42, respectively. In a switching state in the first optical switch 41, connection of the terminal a and the terminal b as illustrated by a state on the left-hand side in FIG. 4 enables the first one of the first optical fiber transmission lines and the first one of the second optical fiber transmission lines to be connected and the first terminal station 21 and the second terminal station 22 to be thereby connected. In the other switching state in the first optical switch 41, connection of the terminal a and the terminal c as illustrated by a state on the right-hand side in FIG. 4 causes the first one of the first optical fiber transmission lines and an input terminal (the terminal c in FIG. 5) of the second optical switch 42 to be connected. Because of this connection, putting the switching state of the second optical switch 42 and the second optical switch at the succeeding stage thereto in a state in which the second optical switch 42 and the other second optical switch can be connected to the third terminal station 23 enables the first terminal station 21 and the third terminal station 23 to be connected by a route including the first one of the first optical fiber transmission lines and the third optical fiber transmission line.

The second optical switch 42 can internally include terminals a to d, as illustrated in FIG. 5 and use the terminal a and the terminal c as input terminals and the terminal b and the terminal d as output terminals. In the second optical switch 42, the terminal a, the terminal b, the terminal c, and the terminal d can be connected to the second one of the first optical fiber transmission lines, the second one of the second optical fiber transmission lines, the terminal c of the first optical switch 41, and an input terminal of the second optical switch 43, respectively.

In a switching state in the second optical switch 42, connection of the terminal a and the terminal b as illustrated by a state on the left-hand side in FIG. 5 enables the second one of the first optical fiber transmission lines and the second one of the second optical fiber transmission lines to be connected and the first terminal station 21 and the second terminal station 22 to be thereby connected. In the switching state, connection of the terminal c and the terminal d causes the terminal c of the first optical switch 41 and an input terminal of the second optical switch 43 to be connected. On this occasion, putting the terminal a and the terminal c of the first optical switch 41 in the non-connected state, that is, connecting the first terminal station 21 and the second terminal station 22, using the first set, enables the terminal c of the second optical switch 42 to be put in a state in which there is no input thereto. Alternatively, connecting the terminal a and the terminal c of the first optical switch 41 enables the first one of the first optical fiber transmission lines and an input terminal of the second optical switch 43, which connects to the third terminal station 23 side, to be put in the connected state. Putting the switching state of the second optical switch 43 and the second optical switch at the succeeding stage thereto in a state in which connection to the third terminal station 23 is allowed enables the first terminal station 21 and the third terminal station 23 to be connected by a transmission route including the first one of the first optical fiber transmission lines and the third optical fiber transmission line.

In the other switching state in the second optical switch 42, connection of the terminal a and the terminal d as illustrated by a state on the right-hand side in FIG. 5 causes the second one of the first optical fiber transmission lines and an input terminal of the second optical switch 43 to be connected. Because of this connection, putting the switching state of the second optical switch 43 and the second optical switch at the succeeding stage thereto in a state in which connection to the third terminal station 23 is allowed enables the first terminal station 21 and the third terminal station 23 to be connected by a route including the second one of the first optical fiber transmission lines and the third optical fiber transmission line.

As described above, when the first optical switch 41 is connected to the second optical switch 42, the second optical switch 42 switches an internal connection in such a way as to output the input from the first optical switch 41 to the third optical fiber transmission line for branching. At this time, the second one of the second optical fiber transmission lines is configured not to be connected to the third optical fiber transmission line for branching. On the other hand, when the first optical switch 41 is not connected to the second optical switch 42, the second optical switch 42 can perform control not only to connect, but also not to connect the second optical fiber transmission lines to the third optical fiber transmission line for branching.

Figure 6:
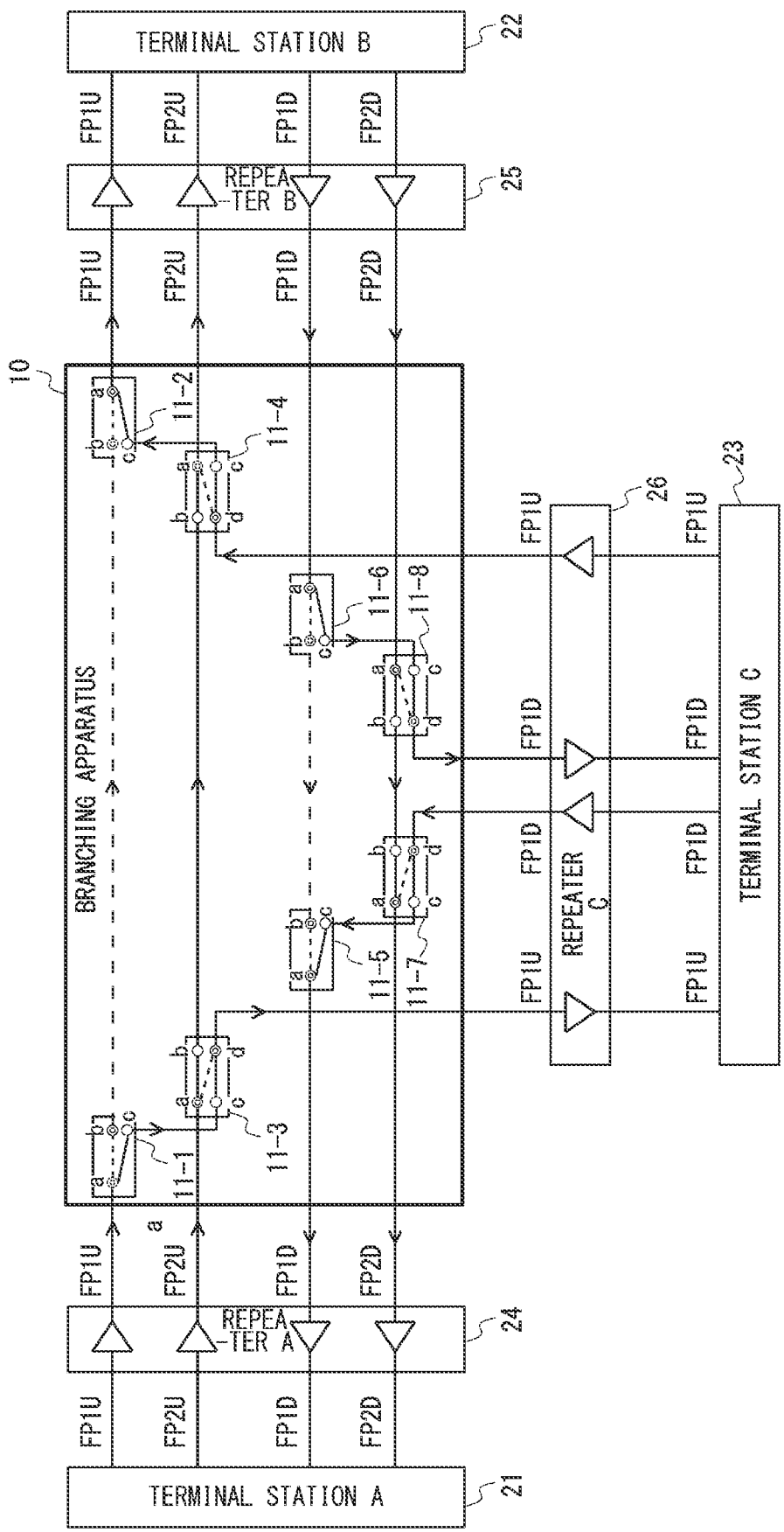
FIG. 6 is a diagram illustrating a configuration example of an optical submarine cable system including the optical submarine branching apparatus according to the second example embodiment.
Figure 7:
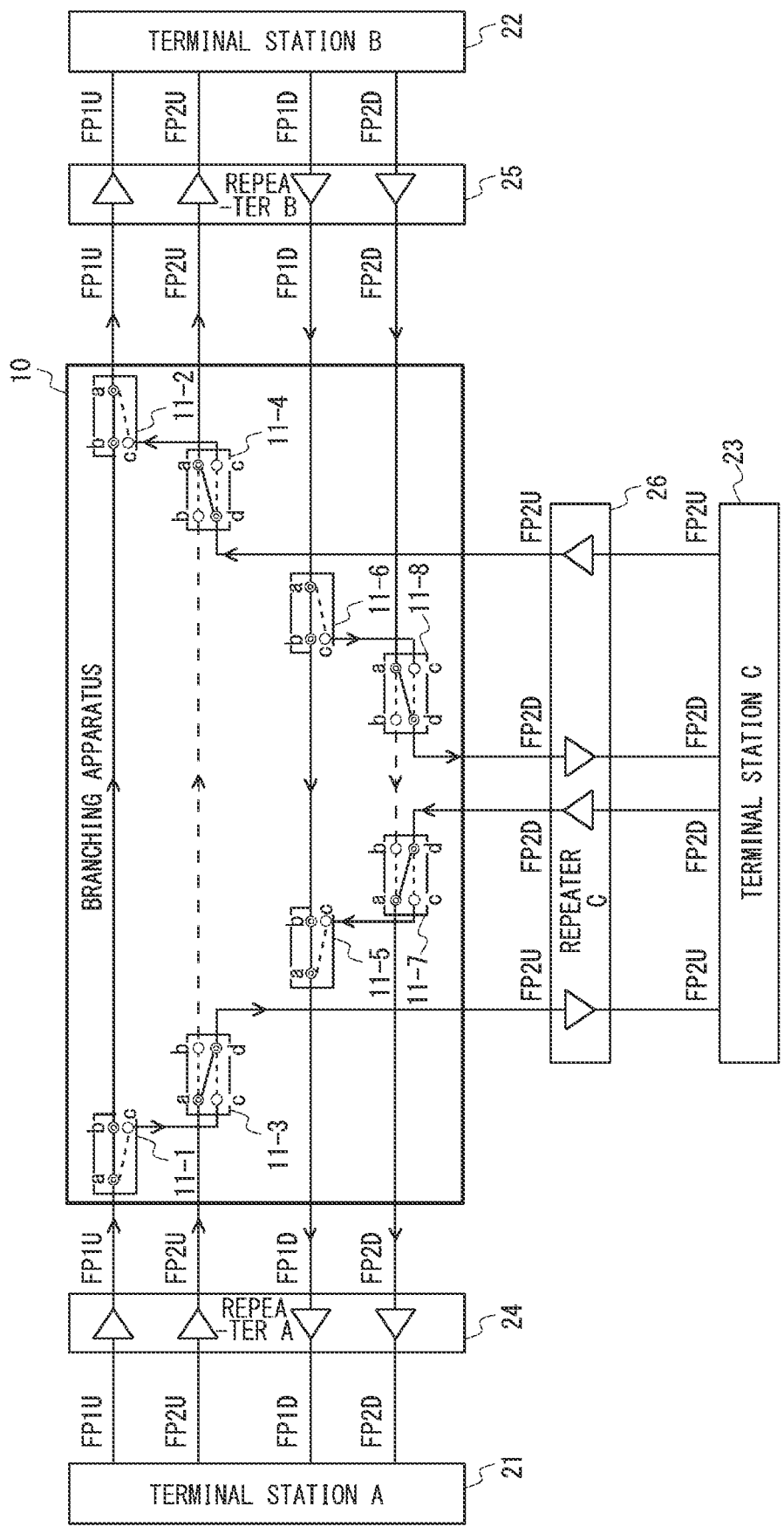
FIG. 7 is a diagram illustrating a configuration example of the optical submarine cable system including the optical submarine branching apparatus according to the second example embodiment.
Figure 8:
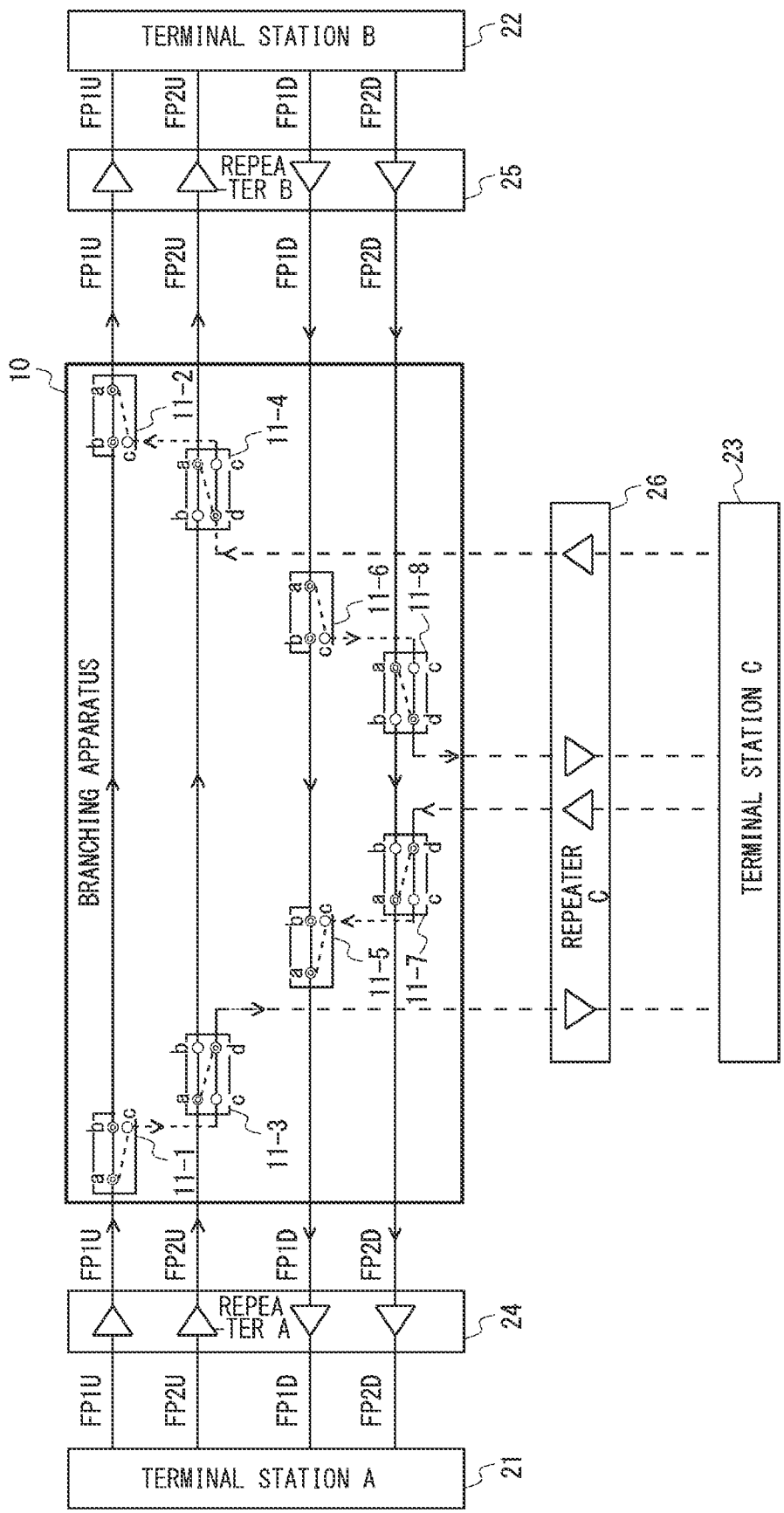
FIG. 8 is a diagram illustrating a configuration example of the optical submarine cable system including the optical submarine branching apparatus according to the second example embodiment.

Next, a detailed configuration example of the system will be described with additional reference to FIGS. 6 to 9. FIGS. 6 to 8 are diagrams illustrating a configuration example of the system and illustrate connection states that are different from one another. In FIGS. 6 to 8, the first terminal station 21, the second terminal station 22, the third terminal station 23, and the optical submarine branching apparatus 1 are exemplified by a terminal station A (21), a terminal station B (22), a terminal station C (23), and a branching apparatus 10, respectively. For example, in the system, the terminal stations A, B, and C, which perform optical communication, are installed on land, and it is configured such that, with the terminal station A (21) and the terminal station B (22) assigned to the trunk line side and the terminal station C (23) assigned to the branch line side, a transmission route can be switched by the branching apparatus 10.

In the system, as exemplified in FIG. 6, one or a plurality of repeaters A (24) can be interposed between the terminal station A (21) and the branching apparatus 10. Likewise, one or a plurality of repeaters B (25) can be interposed between the terminal station B (22) and the branching apparatus 10, and one or a plurality of repeaters C (26) can be interposed between the terminal station C (23) and the branching apparatus 10. Each repeater (repeating apparatus) is an example of an apparatus for submarine installation (submarine apparatus) and can include an optical amplifier that amplifies an input optical signal. Each repeater can also be a submarine reconfigurable optical add/drop multiplexer (ROADM) apparatus or include a ROADM function of a submarine ROADM apparatus.

In particular, it can be said that an effect of being able to share an optical fiber transmission line for branching as in the present example embodiment is beneficial because, when a submarine apparatus is connected between the branching apparatus 10 and the third terminal station on the third optical fiber transmission line, it is possible to reduce the number of submarine apparatuses. Note that examples of an environment requiring a submarine apparatus include a case where distance between terminal stations is so long that it is necessary to install a repeater, and the number and type of required submarine apparatuses sometimes vary depending on an environment.

This system can be configured in such a way that respective optical fiber transmission lines in the plurality of first optical fiber transmission lines, the plurality of second optical fiber transmission lines, and the third optical fiber transmission line are paired into fiber pairs. Each of the fiber pairs can be composed of a pair of an optical fiber for upstream transmission and an optical fiber for downstream transmission. The following description will be made assuming that information is uploaded from the terminal station A (21) side to the terminal station B (22) side or uploaded to the terminal station B (22) via the terminal station C (23) and defining the uploading direction as an upstream direction, for convenience.

Although, in FIG. 6, an example in which two fiber pairs are used to connect the terminal station A (21) and the terminal station B (22) is illustrated, this example is equivalent to the above-described example in which the number of sets is two. The following description will be made assuming that one of the fiber pairs is composed of an optical fiber for a first upstream signal FP1U and an optical fiber for a first downstream signal FP1D and includes the first one of the first optical fiber transmission lines and the first one of the second optical fiber transmission lines. It is also assumed that the other of the fiber pairs is composed of an optical fiber for a second upstream signal FP2U and an optical fiber for a second downstream signal FP2D and includes the second one of the first optical fiber transmission lines and the second one of the second optical fiber transmission lines.

Fiber pairs serving as the third optical fiber transmission line are used as shared fiber pairs. In other words, the fiber pairs can be used as optical fibers for the first upstream signal FP1U and optical fibers for the first downstream signal FP1D, as illustrated in FIG. 6. The fiber pairs can also be used as optical fibers for the second upstream signal FP2U and optical fibers for the second downstream signal FP2D, as illustrated in FIG. 7. For which one of the purposes the fiber pairs are used can be changed by switching in the switching unit exemplified by the switching unit 40.

Note that, in the present example embodiment, the description is made assuming both optical fibers included in a fiber pair to be a single optical fiber transmission line lest optical communication for upstream transmission and optical communication for downstream transmission be performed through different routes (for example, communications by way of different terminal stations). However, the respective optical fibers in a fiber pair can also be considered as separate optical fiber transmission lines.

The branching apparatus 10, which is incorporated into the system as described above, will be described.

The branching apparatus 10 can include a not-illustrated control unit, and, since the control unit is equivalent to the control unit 1a in FIGS. 1 and 2, the control unit will be described as a control unit 1a in the following description.

The branching apparatus 10 can include optical switches 11-1 and 11-6 that operate on one input and two outputs, optical switches 11-2 and 11-5 that operate on two inputs and one output, and optical switches 11-3, 11-4, 11-7, and 11-8 that operate on two inputs and two outputs. The optical switches 11-1 and 11-6 are equivalent to the first optical switch 41 in FIG. 4, and the optical switches 11-3, 11-4, 11-7, and 11-8 are equivalent to the second optical switch 42 in FIG. 5. The optical switches 11-2 and 11-5 are equivalent to an optical switch obtained by replacing the input and the outputs of the first optical switch 41 with each other and are examples of the third optical switch including two input paths and an output path. Note that changes in switching states of the first to third optical switches are as described afore with reference to FIGS. 4 and 5. Hereinafter, the switching unit including the respective optical switches will be described as a switching unit 40. Note that switching control of the switching unit 40 by the control unit 1*a* will be described later.

In FIG. 6, the first fiber pair serving as a medium for the signals FP1U and FP1D transmitted and received by the terminal station A (21) is connected in such a way that bidirectional communication between the terminal station A (21) and the terminal station C (23) and bidirectional communication between the terminal station C (23) and the terminal station B (22) are performed therethrough. Hereinafter, the description will be made with the former and the latter referred to as first bidirectional communication and second bidirectional communication, respectively. In FIG. 6, the second fiber pair serving as a medium for the signals FP2U and FP2D transmitted and received by the terminal station A (21) is connected in such a way that bidirectional communication between the terminal station A (21) and the terminal station B (22) is performed therethrough. Hereinafter, the description will be made with the bidirectional communication referred to as third bidirectional communication.

The first bidirectional communication can be achieved by switching the optical switches 11-1, 11-3, 11-5, and 11-7 to a switching state as illustrated in FIG. 6. The optical switches 11-1 and 11-3 are switched in such a way as to drop (transmit) a signal FP1U output (sent) from the terminal station A (21) to the terminal station C (23) side. This switching causes light including the signal FP1U sent from the terminal station A (21) to enter the branching apparatus 10 through the repeater A (24) and to be transmitted to the repeater C (26) and to the terminal station C (23) through a connection between the terminals a and c of the optical switch 11-1 and a connection between the terminals c and d of the optical switch 11-3. With respect to the opposite direction, the optical switches 11-5 and 11-7 are switched in such a way as to transmit a signal FP1D sent from the terminal station C (23) to the terminal station A (21) side. This switching causes light including the signal FP1D sent from the terminal station C (23) to be transmitted to the repeater A (24) and to the terminal station A (21) through the repeater C (26) and a connection between the terminals d and c of the optical switch 11-7 and a connection between the terminals c and a of the optical switch 11-5 in the branching apparatus 10.

The second bidirectional communication can be achieved by switching the optical switches 11-2, 11-4, 11-6, and 11-8 to a switching state as illustrated in FIG. 6. The optical switches 11-2 and 11-4 are switched in such a way as to transmit the signal FP1U sent from the terminal station C (23) to the terminal station B (22) side. This switching causes light including the signal FP1U sent from the terminal station C (23) to be transmitted to the repeater B (25) and to the terminal station B (22) through the repeater C (26) and a connection between the terminals d and c of the optical switch 11-4 and a connection between the terminals c and a of the optical switch 11-2 in the branching apparatus 10. With respect to the opposite direction, the optical switches 11-6 and 11-8 are switched in such a way as to drop (transmit) the signal FP1D sent from the terminal station B (22) to the terminal station C (23) side. This switching causes light including the signal FP1D sent from the terminal station B (22) to enter the branching apparatus 10 through the repeater B (25) and to be transmitted to the repeater C (26) and to the terminal station C (23) through a connection between the terminals a and c of the optical switch 11-6 and a connection between the terminals c and d of the optical switch 11-8.

The third bidirectional communication can be achieved by switching the optical switches 11-3, 11-4, 11-7, and 11-8 to a switching state as illustrated in FIG. 6. The optical switches 11-3 and 11-4 are switched in such a way as to transmit a signal FP2U sent from the terminal station A (21) to the terminal station B (22) side. This switching causes light including the signal FP2U sent from the terminal station A (21) to enter the branching apparatus 10 through the repeater A (24), to be directly transmitted through a connection between the terminals a and b of the optical switch 11-3 and a connection between the terminals b and a of the optical switch 11-4, and to be directed to the repeater B (25) and to the terminal station B (22). With respect to the opposite direction, the optical switches 11-7 and 11-8 are switched in such a way as to transmit a signal FP2D sent from the terminal station B (22) to the terminal station A (21) side. This switching causes light including the signal FP2D sent from the terminal station B (22) to enter the branching apparatus 10 through the repeater B (25), to be directly transmitted through a connection between the terminals a and b of the optical switch 11-8 and a connection between the terminals b and a of the optical switch 11-7, and to be directed to the repeater A (24) and to the terminal station A (21).

The branching apparatus 10 is capable of switching the connection state illustrated in FIG. 6 to a connection state illustrated in FIG. 7 and restoring the connection state to the original state. In the connection state illustrated in FIG. 7, a fiber pair used for connection to the terminal station C (23), differing from the one in the connection state illustrated in FIG. 6, is the second fiber pair. In other words, the connection state illustrated in FIG. 7 is a connection state obtained from the connection state illustrated in FIG. 6 by, with respect to a fiber pair used for connection to the terminal station C (23), replacing the first one with the second one of the fiber pairs.

In FIG. 7, the second fiber pair serving as a medium for signals FP2U and FP2D transmitted and received by the terminal station A (21) is connected in such a way that bidirectional communication between the terminal station A (21) and the terminal station C (23) and bidirectional communication between the terminal station C (23) and the terminal station B (22) are performed therethrough. Hereinafter, the description will be made with the former and the latter referred to as fourth bidirectional communication and fifth bidirectional communication, respectively. In FIG. 7, the first fiber pair serving as a medium for signals FP1U and FP1D transmitted and received by the terminal station A (21) is connected in such a way that bidirectional communication between the terminal station A (21) and the terminal station B (22) is performed therethrough. Hereinafter, the description will be made with the bidirectional communication referred to as sixth bidirectional communication.

The fourth bidirectional communication can be achieved by switching the optical switches 11-3 and 11-7 to a switching state as illustrated in FIG. 7. The optical switch 11-3 is switched in such a way as to drop (transmit) a signal FP2U sent from the terminal station A (21) to the terminal station C (23) side. This switching causes light including the signal FP2U sent from the terminal station A (21) to enter the branching apparatus 10 through the repeater A (24) and to be transmitted to the repeater C (26) and to the terminal station C (23) through a connection between the terminals a and d of the optical switch 11-3. With respect to the opposite direction, the optical switch 11-7 is switched in such a way as to transmit a signal FP2D sent from the terminal station C (23) to the terminal station A (21) side. This switching causes light including the signal FP2D sent from the terminal station C (23) to be transmitted to the repeater A (24) and to the terminal station A (21) through the repeater C (26) and a connection between the terminals d and a of the optical switch 11-7 in the branching apparatus 10.

The fifth bidirectional communication can be achieved by switching the optical switches 11-4 and 11-8 to a switching state as illustrated in FIG. 7. The optical switch 11-4 is switched in such a way as to transmit the signal FP2U sent from the terminal station C (23) to the terminal station B (22) side. This switching causes light including the signal FP2U sent from the terminal station C (23) to be transmitted to the repeater B (25) and to the terminal station B (22) through the repeater C (26) and a connection between the terminals d and a of the optical switch 11-4 in the branching apparatus 10. With respect to the opposite direction, the optical switch 11-8 is switched in such a way as to drop (transmit) the signal FP2D sent from the terminal station B (22) to the terminal station C (23) side. This switching causes light including the signal FP2D sent from the terminal station B (22) to enter the branching apparatus 10 through the repeater B (25) and to be transmitted to the repeater C (26) and to the terminal station C (23) through a connection between the terminals a and d of the optical switch 11-8.

The sixth bidirectional communication can be achieved by switching the optical switches 11-1, 11-2, 11-5, and 11-6 to a switching state as illustrated in FIG. 7. The optical switches 11-1 and 11-2 are switched in such a way as to transmit a signal FP1U sent from the terminal station A (21) to the terminal station B (22) side. This switching causes light including the signal FP1U sent from the terminal station A (21) to enter the branching apparatus 10 through the repeater A (24), to be directly transmitted through a connection between the terminals a and b of the optical switch 11-1 and a connection between the terminals b and a of the optical switch 11-2, and to be directed to the repeater B (25) and to the terminal station B (22). With respect to the opposite direction, the optical switches 11-5 and 11-6 are switched in such a way as to transmit a signal FP1D sent from the terminal station B (22) to the terminal station A (21) side. This switching causes light including the signal FP1D sent from the terminal station B (22) to enter the branching apparatus 10 through the repeater B (25), to be directly transmitted through a connection between the terminals a and b of the optical switch 11-6 and a connection between the terminals b and a of the optical switch 11-5, and to be directed to the repeater A (24) and to the terminal station A (21).

Although the details are not described, the system can also be put in a connection state in which, for example, the terminal station C (23) and the terminal station B (22) are not connected in the connection state in FIG. 6 or the connection state in FIG. 7.

The branching apparatus 10 is capable of switching the connection state illustrated in FIG. 6 or the connection state illustrated in FIG. 7 to a connection state illustrated in FIG. 8 and restoring the connection state to the original state. The connection state illustrated in FIG. 8 can be said to be a basic connection state and is a connection state in which connection to the terminal station C (23) using any fiber pair is not established.

In FIG. 8, the first fiber pair serving as a medium for signals FP1U and FP1D transmitted and received by the terminal station A (21) is connected in such a way that bidirectional communication between the terminal station A (21) and the terminal station B (22) is performed therethrough. Hereinafter, the description will be made with the bidirectional communication referred to as seventh bidirectional communication. In FIG. 8, the second fiber pair serving as a medium for signals FP2U and FP2D transmitted and received by the terminal station A (21) is also connected in such a way that bidirectional communication between the terminal station A (21) and the terminal station B (22) is performed therethrough. Hereinafter, the description will be made with the bidirectional communication referred to as eighth bidirectional communication.

The seventh bidirectional communication can be achieved by switching the optical switches 11-1, 11-2, 11-5, and 11-6 to a switching state as illustrated in FIG. 8. The seventh bidirectional communication can be described in the same manner as the sixth bidirectional communication, and description thereof will be omitted.

The eighth bidirectional communication can be achieved by switching the optical switches 11-3, 11-4, 11-7, and 11-8 to a switching state as illustrated in FIG. 8. The eighth bidirectional communication can be described in the same manner as the third bidirectional communication, and description thereof will be omitted.

As described with respect to the bidirectional communication (second bidirectional communication or fifth bidirectional communication) from the terminal station C (23) to the terminal station B (22), the switching unit 40 is capable of controlling connection in such a way as to connect one of the second optical fiber transmission lines to the third optical fiber transmission line. In other words, the switching unit 40 can include a function of switching any one of the plurality of second optical fiber transmission lines to connect to the third optical fiber transmission line. As described in the examples of bidirectional communication in the present example embodiment, the switching unit 40 can include a configuration in which the second optical switch and the third optical switch are connected in multi-stages, and, in that case, the switching unit 40 is capable of switching a transmission route by controlling the second optical switch and the third optical switch.

As illustrated by the examples in FIGS. 6 to 8, the switching unit 40 can include a function of switching any one of the plurality of first optical fiber transmission lines and the plurality of second optical fiber transmission lines to connect to the third optical fiber transmission line. As illustrated by the examples in FIGS. 6 to 8, the switching unit 40 can include a configuration in which the first to third optical switches are connected in multi-stages, and, in that case, the switching unit 40 is capable of switching a transmission route by controlling the optical switches.

As described above, the connection state in FIG. 6 is a state in which one of the two fiber pairs connecting the terminal station A (21) and terminal station B (22) is connected to the terminal station C (23), and the connection state in FIG. 7 is a state in which the other fiber pair is connected to the terminal station C (23). The connection state in FIG. 8 is a state in which both of the two fiber pairs connect the terminal station A (21) and the terminal station B (22).

As described above, each of the fiber pairs connecting the terminal station A (21) and the terminal station B (22) can be used as a trunk line, and the fiber pairs connecting the branching apparatus 10 and the terminal station C (23) can be used as a branch line. In other words, the system illustrated in FIGS. 6 to 8 can include two trunk lines and a single branch line. Note that, although a distinction between a trunk line and a branch line is generally made based on a power supply system and line length, distinction criteria are not limited thereto.

The following description will be made based on the distinction between the trunk line and the branch line that are arrange as described above. The connection state in FIG. 6 indicates a state in which the terminal station A (21) is connected to the terminal station B (22), using the second trunk line and the terminal station C (23) is connected to the terminal station A (21) and the terminal station B (22) by connecting the first trunk line to the branch line. The connection state in FIG. 7 indicates a state in which the terminal station A (21) is connected to the terminal station B (22), using the first trunk line and the terminal station C (23) is connected to the terminal station A (21) and the terminal station B (22) by connecting the second trunk line to the branch line. The connection state in FIG. 8 indicates, as a basic connection state, a state in which the terminal station A (21) and the terminal station B (22) are connected using both the first trunk line and the second trunk line. The switching unit 40 is also capable of performing switching bringing a connection state to the above-described basic connection state.

As described above, in the system, two optical fiber transmission lines connecting terminal stations (for example, trunk stations) to each other share a transmission line (branch line) to another terminal station (for example, a branch station). In the system, this sharing enables either transmission line of the two optical fiber transmission lines to be selectively connected to the branch line, and it is needless to say that the connection state can be brought to a state in which neither transmission line is connected to the branch line.

Figure 9:
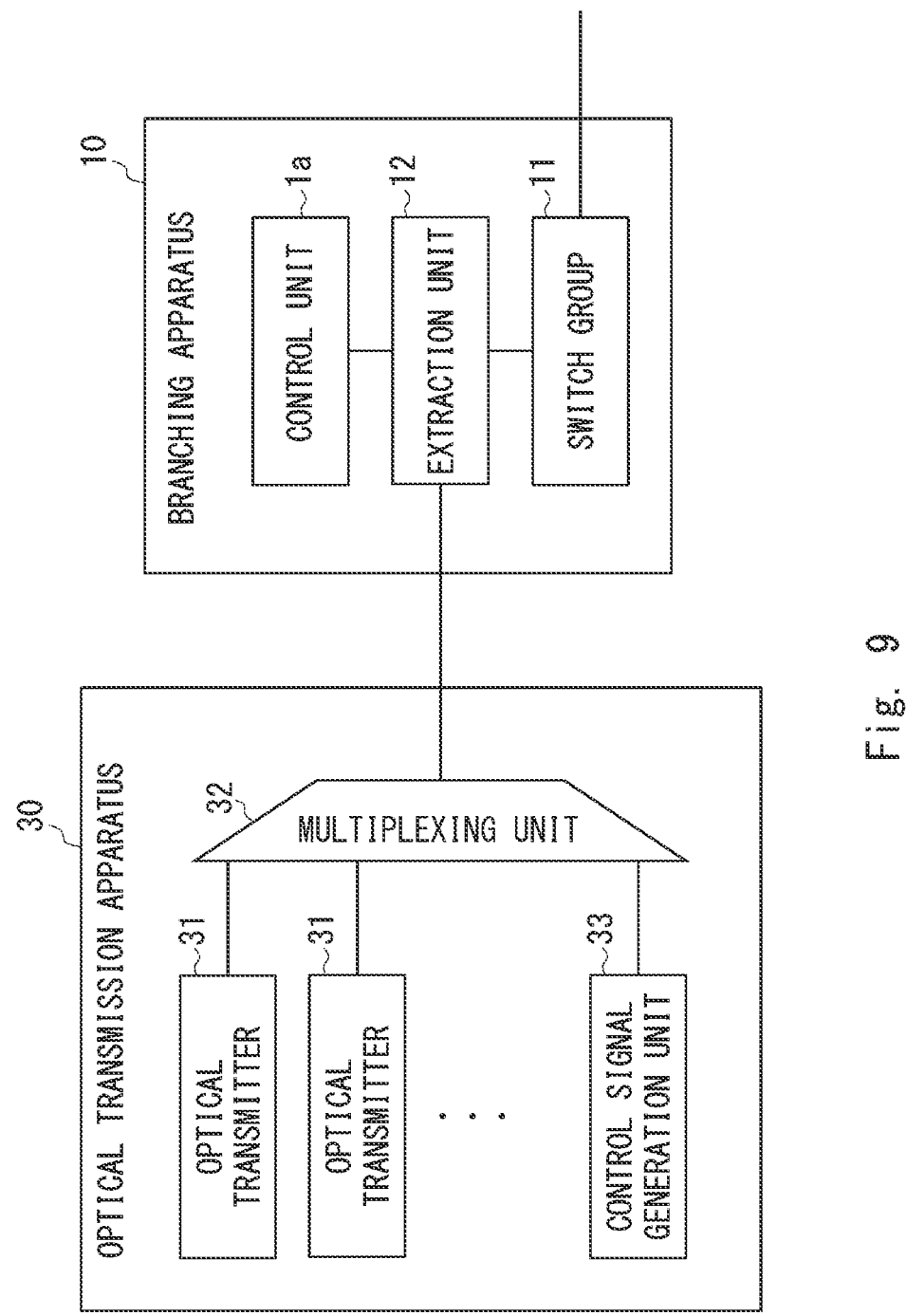
FIG. 9 is a block diagram illustrating a configuration example of a portion of the optical submarine cable system in FIGS. 6 to 8.

Next, an example of switching control of the switching unit 40 and a configuration example of the terminal station A (21), the terminal station B (22), and the terminal station C (23) will be described with additional reference to FIG. 9. FIG. 9 is a block diagram illustrating a configuration example of a portion of the system exemplified in FIGS. 6 to 8.

As illustrated in FIG. 9, in the system, each terminal station can include an optical transmission apparatus 30. The optical transmission apparatus 30 is connected to the branching apparatus 10 via an optical fiber transmission line. The optical transmission apparatus 30 can include optical transmitters 31 each of which is configured to send an optical signal of a wavelength, a multiplexing unit 32 configured to input and multiplex optical signals of respective wavelengths from the optical transmitters 31, and a control signal generation unit 33. Additionally, although not illustrated, the optical transmission apparatus 30 can include a demultiplexing unit and an optical receiver for each wavelength. Note that the demultiplexing unit can be integrated with the multiplexing unit and thereby configured as a multiplexing/demultiplexing unit. The terminal station C (23) can, for example, include an optical transmission apparatus 30 for communication with the terminal station A (21) and an optical transmission apparatus 30 for communication with the terminal station B (22). The terminal station A (21) and the terminal station B (22) can include an optical transmission apparatus 30 with respect to each fiber pair.

The control signal generation unit 33 generates a control signal for controlling the optical switches 11-1 to 11-8, and the multiplexing unit 32 also multiplexes the control signal. The control signal may be an optical signal of a wavelength different from a main signal on which data to be sent are superimposed (a wavelength different from output wavelengths of the optical transmitters 31) or a signal obtained by modulating a main signal with a low frequency component by full-wave modulation. Such a configuration enables the optical transmission apparatus 30 to output the control signal as an optical signal. Note that the configuration in which a control signal is output does not include to be employed by all the terminal stations. Note, however, that, in order to provide redundancy in consideration of a malfunction, such as disconnection, it is desirable to employ a configuration in which a plurality of terminal stations output control signals, that is, a configuration in which the branching apparatus 10 is able to extract control signals from a plurality of routes.

The branching apparatus 10 can include an optical switch group 11, an extraction unit 12 configured to extract a control signal from an optical signal received from the optical transmission apparatus 30 via an optical fiber transmission line, and a control unit 1a configured to control the optical switch group 11 in accordance with an extracted control signal. Note that the optical switch group 11 is composed of the optical switches 11-1 to 11-8 illustrated in FIGS. 6 and 7.

The extraction unit 12 may be installed with respect to each optical fiber and may also be installed on the input side from a branch station. When a plurality of extraction units 12 are installed, a plurality of control units 1a may be installed in correspondence to the respective extraction units 12. The extraction unit 12 extracts a control signal from an optical signal (including a main signal and a control signal) that is input via the optical fiber transmission line. The extraction unit 12 may be constituted by, for example, a combination of an optical coupler (branching coupler) and an optical filter extracting a control signal. When the control signal uses a wavelength different from that of the main signal, the optical filter can be a filter selectively transmitting the wavelength, and, when the control signal is a signal generated by superimposing a low frequency component on a main signal, the optical filter can be a low-pass filter.

The control unit 1a controls the optical switch group 11 in response to reception of a control signal from a terminal station as described above. In other words, the switching control by the control unit 1a can be performed based on the following control signal. That is, the above-described control signal is a signal that is extractable from a wavelength-multiplexed optical signal having been optically transmitted through each optical fiber transmission line in the plurality of first optical fiber transmission lines, the plurality of second optical fiber transmission lines, and the third optical fiber transmission line. In particular, as described above, it can be said that the above-described control signal is preferably a signal extractable from wavelength-multiplexed optical signals optically transmitted through at least two or more optical fiber transmission lines out of such optical fiber transmission lines, in terms of providing the control signal with redundancy.

Note, however, that the control unit 1a can be configured to control the optical switch group 11, based on a control signal received from another route (a route different from the data communication route) as an electrical signal or an optical signal.

Alternatively, the control unit 1a can also be configured to control the optical switch group 11 according to change in external power supply to the branching apparatus 10. In this case, the branching apparatus 10 is configured to include a detection unit configured to detect whether or not external power is supplied from each terminal station. When, for example, it is detected that external power supply between trunk stations is interrupted, the control unit 1a can control the switch group 11 to drop a trunk line to a branch line.

In the system described referring to FIGS. 6 to 8, the branching apparatus 10 can also be configured to include, out of the optical switches 11-1 to 11-8, only the optical switches 11-1 to 11-4 that are required for the upstream transmission or to include only the optical switches 11-5 to 11-8 that are required for the downstream transmission.

Figure 10:
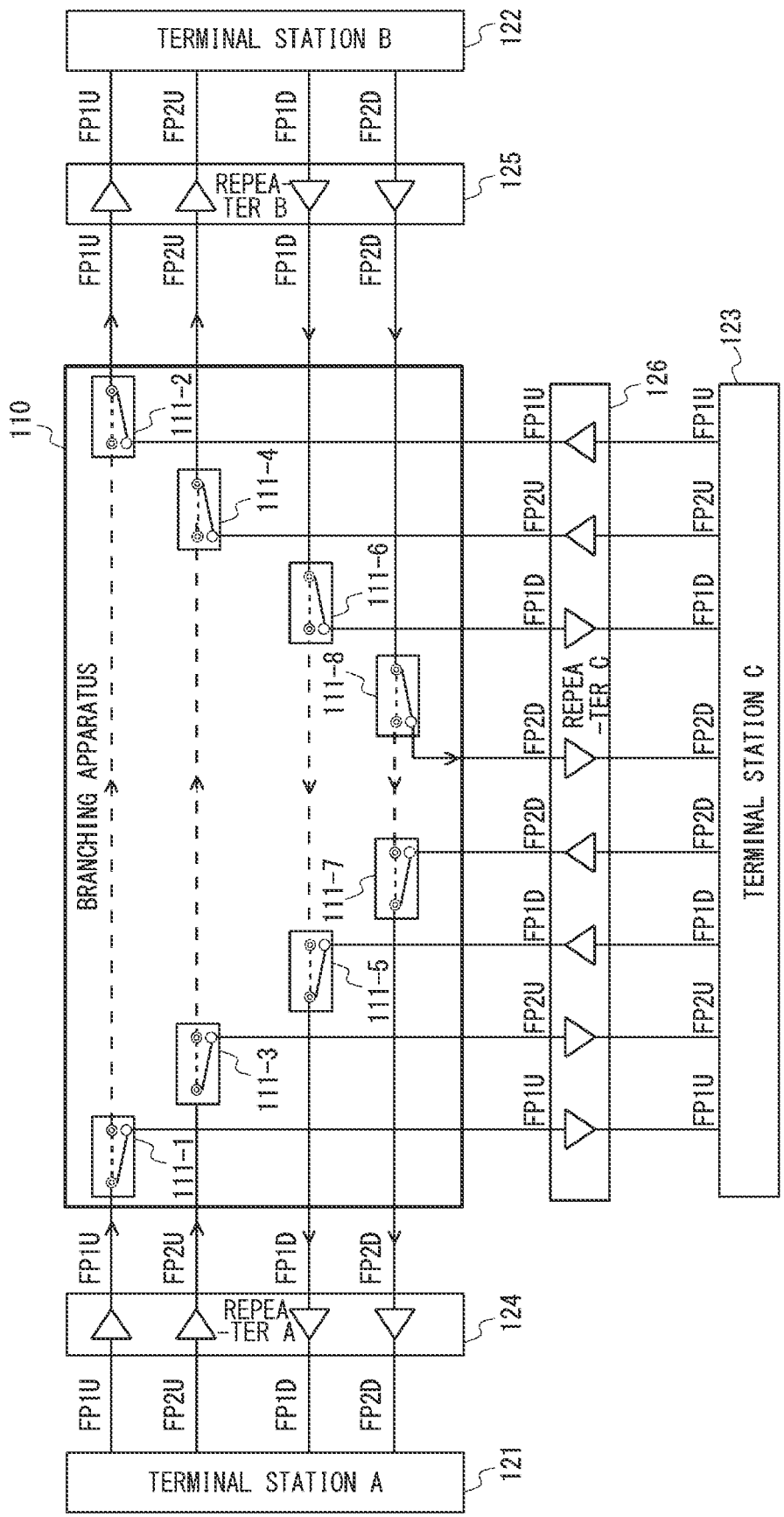
FIG. 10 is a diagram illustrating an optical submarine cable system including an optical submarine branching apparatus according to a comparative example.

Next, an optical submarine cable system according to a comparative example (hereinafter, referred to as a comparative system) will be described with reference to FIG. 10. FIG. 10 is a diagram illustrating a configuration of the comparative system. In the comparative system, a switching function of switching a trunk line to connect to a branch line is provided with respect to all trunk lines. Specifically, the respective constituent elements in the comparative system, although description thereof will be omitted, correspond to the respective constituent elements of the system exemplified in FIG. 6 and the like, and are denoted by reference signs obtained by adding 100 to the reference signs of the corresponding constituent elements of the system. For example, the comparative system includes a branching apparatus 110 for branching.

Note, however, that the comparative system is a system in which, as illustrated in FIG. 10, first optical switches and third optical switches are employed as optical switches 111-3 and 111-7 and optical switches 111-4 and 111-8, respectively. Thus, the comparative system can only be configured in such a way that all the fiber pairs are dropped to the terminal station C (126) side as illustrated in FIG. 10 or any of the fiber pairs is not dropped to the terminal station C (126) side by directly connecting the trunk stations to each other through the fiber pairs. In other words, in the comparative system, selection of a fiber pair connecting to the terminal station C (126) side as in the system is not allowed.

In addition, in the comparative system including such a configuration, fiber pairs connecting the optical switches 111-3, 111-4, 111-7, and 111-8 to the terminal station C (126) via a repeater C (125) are additionally required for branching, compared with the system. It is needless to say that the additional fiber pairs causes the repeater C (125) interposed in the fiber pairs or optical amplifiers inside the repeater C (125) to be additionally required, compared with the system. As described above, in the comparative system, a number of branch lines equal to, for example, the number of trunk lines are required and submarine instruments on the branch lines corresponding to the respective branch lines are further required, which causes cost to be increased.

As described above, according to the present example embodiment, in an optical submarine cable system in which terminal stations are connected by a plurality of optical fiber transmission lines, it is possible to connect a specified optical fiber transmission line to a third optical fiber transmission line for branching, in a similar manner to the first example embodiment. In the system, this capability enables the number of fiber pairs on the branching side to be reduced, which enables the number of apparatuses, such as repeaters, on the branched side to be reduced and cost to be thereby reduced. For example, even when a network of multiple fiber pairs including a lot of the branching apparatuses 10 according to the present example embodiment is constructed, it becomes possible to flexibly configure add/drop of signals among the multiple fiber pairs according to change in traffic demand in the network without worrying about additional cost. In the system, it becomes possible to reduce the number of apparatuses, such as a repeater, on the terminal station C (26) side at the time of construction of a network.

In particular, using optical switches including two inputs and two outputs as some optical switches inside the branching apparatus 10 enables a fiber pair dropped to the terminal station C (26) side to be selected without increasing the number of optical switches, and it is possible to reduce cost in terms of this perspective.

Third Example Embodiment

Figure 11:
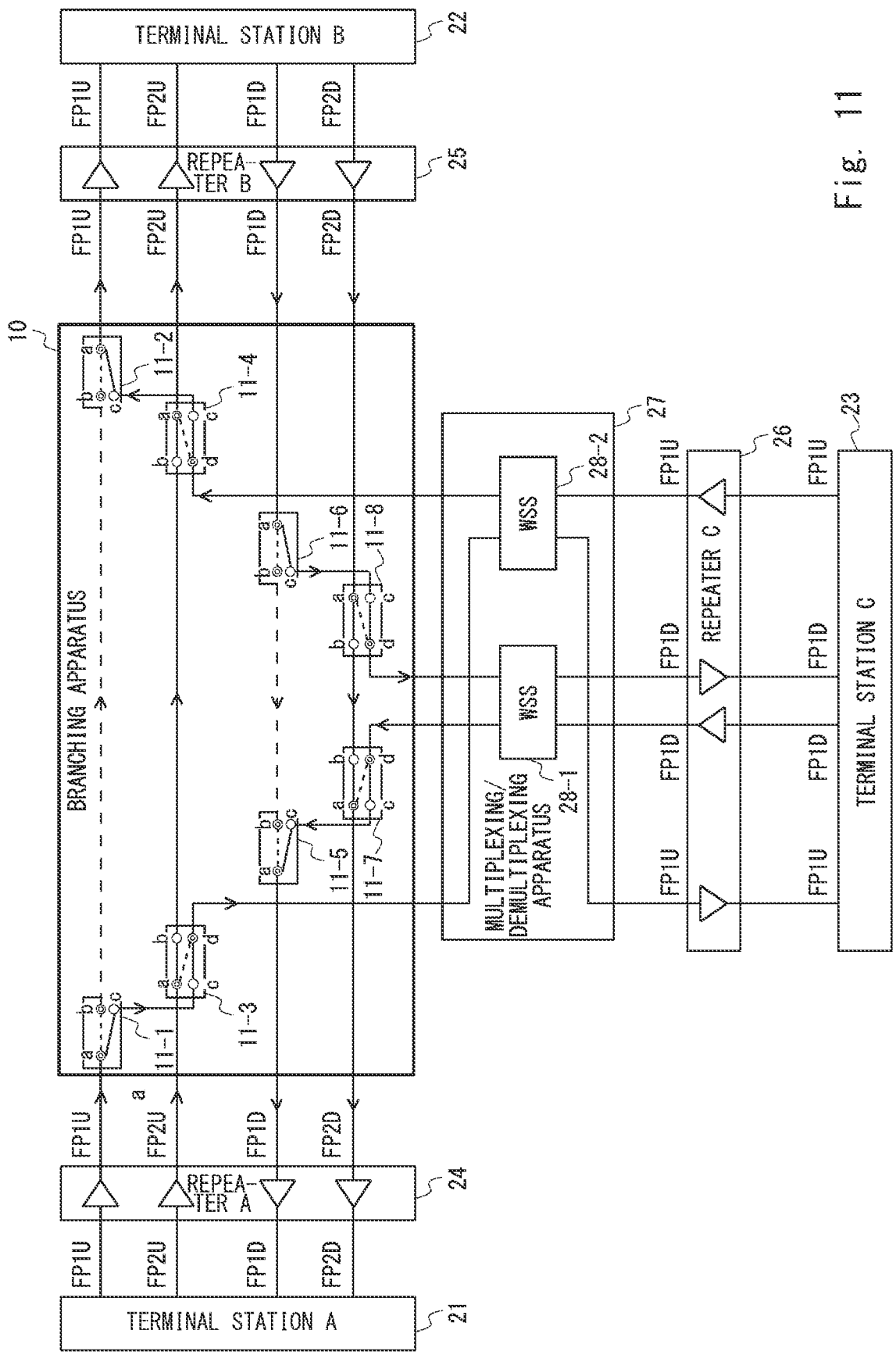
FIG. 11 is a diagram illustrating a configuration example of an optical submarine cable system including an optical submarine branching apparatus according to a third example embodiment.
Figure 12:
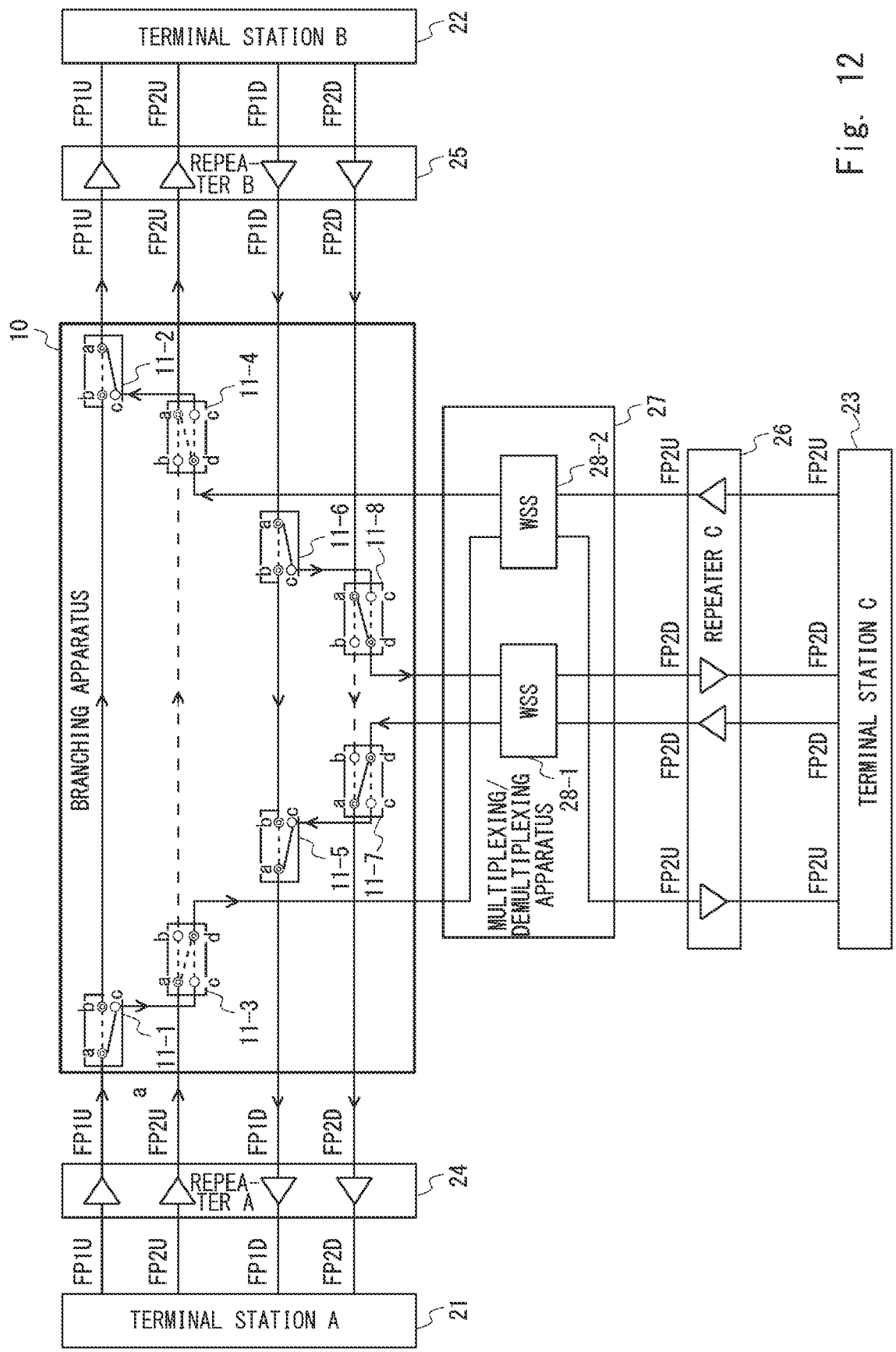
FIG. 12 is a diagram illustrating a configuration example of the optical submarine cable system including the optical submarine branching apparatus according to the third example embodiment.

A third example embodiment will be described with additional reference to FIGS. 11 and 12, focusing on differences from the second example embodiment. Note, however, that, to the third example embodiment, various examples described in the first and second example embodiments can be appropriately applied. FIGS. 11 and 12 are diagrams illustrating a configuration example of an optical submarine cable system according to the third example embodiment.

The optical submarine cable system illustrated in FIG. 11 (hereinafter, referred to as the system) is a system configured by, in a system illustrated in FIG. 6, interposing a multiplexing/demultiplexing apparatus 27 between a branching apparatus 10 and a repeater C (26), that is, on the branched side (for example, the branch line side).

The multiplexing/demultiplexing apparatus 27 can include wavelength selective switches (WSSes) 28-1 and 28-2 and can, although not illustrated, also include optical filters. The WSSes 28-1 and 28-2 (and the optical filters) are examples of a selection unit configured to perform wavelength selection. As exemplified in the example embodiment, submarine apparatuses connecting to a third optical fiber transmission line connecting to a third terminal station can be the multiplexing/demultiplexing apparatus 27 including a function of selecting a wavelength to be output to the succeeding stage and a repeater (repeating apparatus) C (26) on the terminal station C (23) side. Note that the repeater C (26) is sometimes not required depending on length of optical cables. In particular, although switching of a connection destination requires selection of a wavelength to be output to the succeeding stage, including the multiplexing/demultiplexing apparatus 27 enables the requirement to be coped with and light to be multiplexed and demultiplexed based on wavelength, using a specific fiber pair.

The WSS 28-1 can be connected between a terminal d of an optical switch 11-7 and the repeater C (26), for a downstream signal in a connection between a terminal station A (21) and a terminal station C (23). The WSS 28-1 can also be connected between a terminal d of an optical switch 11-8 and the repeater C (26), for a downstream signal in a connection between the terminal station C (23) and a terminal station B (22).

The WSS 28-2 can be connected between a terminal d of an optical switch 11-3 and the repeater C (26), for an upstream signal in the connection between the terminal station A (21) and the terminal station C (23). The WSS 28-2 can also be connected between a terminal d of an optical switch 11-4 and the repeater C (26), for an upstream signal in the connection between the terminal station C (23) and the terminal station B (22). Such a configuration enables the system to be brought to a connection state as described in FIG. 6, as illustrated in FIG. 11.

The system can also be brought to a connection state as described in FIG. 7, as illustrated in FIG. 12. Although not illustrated, the system can also be put in a basic connection state as described in FIG. 8.

Switching control of the optical switches is as described afore with reference to FIGS. 6 to 8. Specifically, the only difference is that the connection from the branching apparatus 10 to the repeater C (26) described in the connection states in FIGS. 6 to 8 is replaced with a connection from the branching apparatus 10 to the WSS 28-1 or the WSS 28-2. The multiplexing/demultiplexing apparatus 27 is, as with a control unit 1a of the branching apparatus 10, capable of acquiring a control signal from an optical signal or the like and performing control of wavelength selection and the like, based on the control signal. This control is only required to be performed in such a way as to appropriately transmit an optical signal of a required wavelength to a transmission destination according to switching control of the optical switches.

In a connection state in FIG. 11, connections can be controlled in the following manner with respect to a first fiber pair. That is, the control is performed in such a way that the WSS 28-1 can transmit a wavelength output from the terminal station B (22) to the terminal station C (23) side and, in conjunction therewith, the control is performed in such a way that the WSS 28-1 can transmit a wavelength output from the terminal station C (23) to the terminal station A (21) side. In addition, the control is performed in such a way that the WSS 28-2 can transmit a wavelength output from the terminal station A (21) to the terminal station C (23) side and, in conjunction therewith, the control is performed in such a way that the WSS 28-2 can transmit a wavelength output from the terminal station C (23) to the terminal station B (22) side.

In a connection state in FIG. 12, connections can be controlled in the following manner with respect to a second fiber pair. That is, the control is performed in such a way that the WSS 28-1 can transmit a wavelength output from the terminal station B (22) to the terminal station C (23) side and, in conjunction therewith, the control is performed in such a way that the WSS 28-1 can transmit a wavelength output from the terminal station C (23) to the terminal station A (21) side. In addition, the control is performed in such a way that the WSS 28-2 can transmit a wavelength output from the terminal station A (21) to the terminal station C (23) side and, in conjunction therewith, the control is performed in such a way that the WSS 28-2 can transmit a wavelength output from the terminal station C (23) to the terminal station B (22) side.

In the system described in FIGS. 11 and 12, the branching apparatus 10 can also be configured to include, out of the optical switches 11-1 to 11-8, only the optical switches 11-1 to 11-4 that are required for the upstream transmission or to include only the optical switches 11-5 to 11-8 that are required for the downstream transmission.

Consequently, according to the present example embodiment, it is possible to appropriately transmit an optical signal of a required wavelength to a transmission destination when a transmission line is branched or a transmission line having branched is restored to an original state, in addition to the advantageous effects of the second example embodiment.

Fourth Example Embodiment

Figure 13:
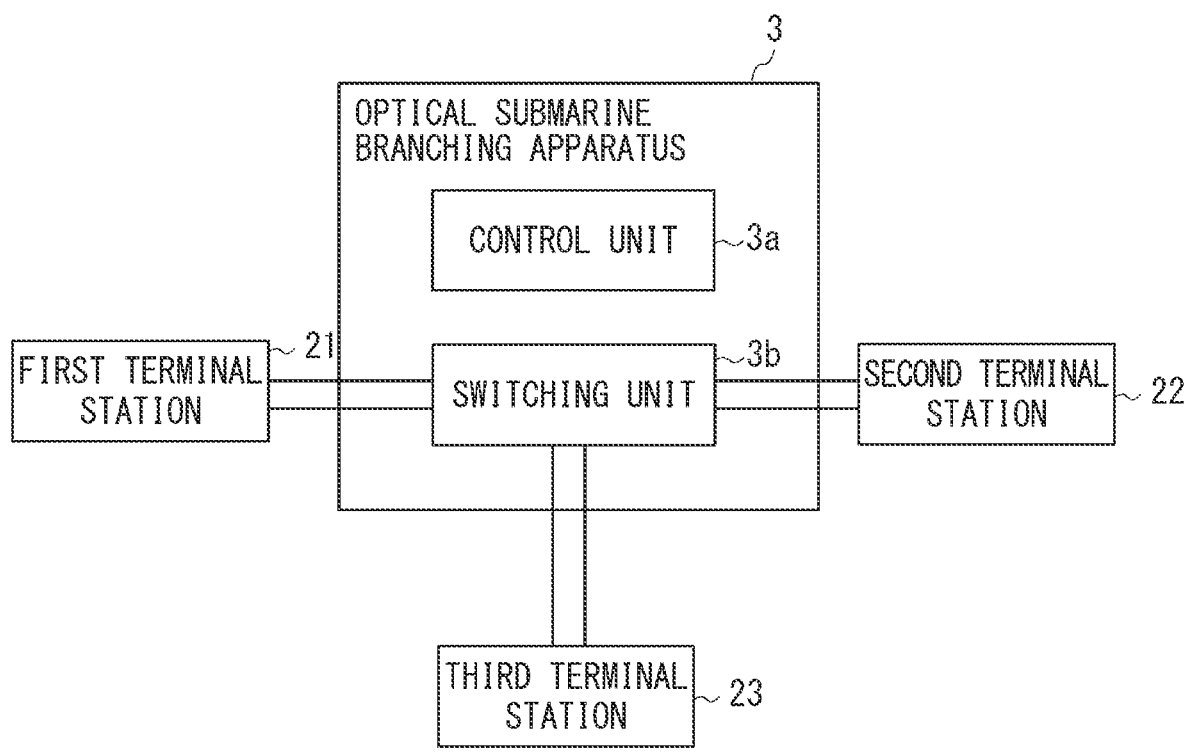
FIG. 13 is a schematic diagram illustrating a configuration example of an optical submarine cable system including an optical submarine branching apparatus according to a fourth example embodiment.

A fourth example embodiment will be described with additional reference to FIG. 13, focusing on differences from the first example embodiment. Note, however, that, to the fourth example embodiment, various examples described in the first to third example embodiments can be appropriately applied. FIG. 13 is a schematic diagram illustrating a configuration example of an optical submarine cable system including an optical submarine branching apparatus according to the fourth example embodiment.

As illustrated in FIG. 13, the optical submarine cable system according to the present example embodiment (hereinafter, referred to as the system) can include a first terminal station 21, a second terminal station 22, and a third terminal station 23 and, in conjunction therewith, include an optical submarine branching apparatus 3 configured to branch connections thereamong.

The optical submarine branching apparatus 3 can include a control unit 3a corresponding to the control unit 1a in FIG. 2 and, in conjunction therewith, include a switching unit 3b corresponding to the switching unit 1b in FIG. 2. The switching unit 3b can be connected to one or a plurality of fourth optical fiber transmission lines connected to the third terminal station 23, in addition to the function of the switching unit 1b. In this case, the switching unit 3b can include a function of switching any one of the plurality of first optical fiber transmission lines to connect to the fourth optical fiber transmission lines. The control unit 3a is configured to be capable of also performing control of such switching, compared with the control unit 1a.

In other words, in the system, third optical fiber transmission line described afore can be installed in plurality, and description is made considering the third optical fiber transmission lines as the fourth optical fiber transmission lines. Thus, a submarine apparatus or the like as described in the second example embodiment can be interposed in the fourth optical fiber transmission lines, as with the third optical fiber transmission lines.

Further, in the present example embodiment, the switching unit 3b can include a function of switching any one of the plurality of second optical fiber transmission lines to connect to the fourth optical fiber transmission lines, as with the function of connection to the third optical fiber transmission line.

Note that it can be said that considering the fourth optical fiber transmission lines connecting to the third terminal station 23 is equivalent to a case where each optical fiber in a fiber pair is considered as an individual optical fiber transmission line in the second example embodiment. Thus, in consideration of this point, it can be said that description about a specific configuration in the second example embodiment can also be applied to the present example embodiment.

Consequently, according to the present example embodiment, it is possible to branch a plurality of transmission lines to the third terminal station and this capability enables the number of interposed submarine apparatuses to be further reduced, in addition to the advantageous effects in any of the first to third example embodiments.

Fifth Example Embodiment

Figure 14:
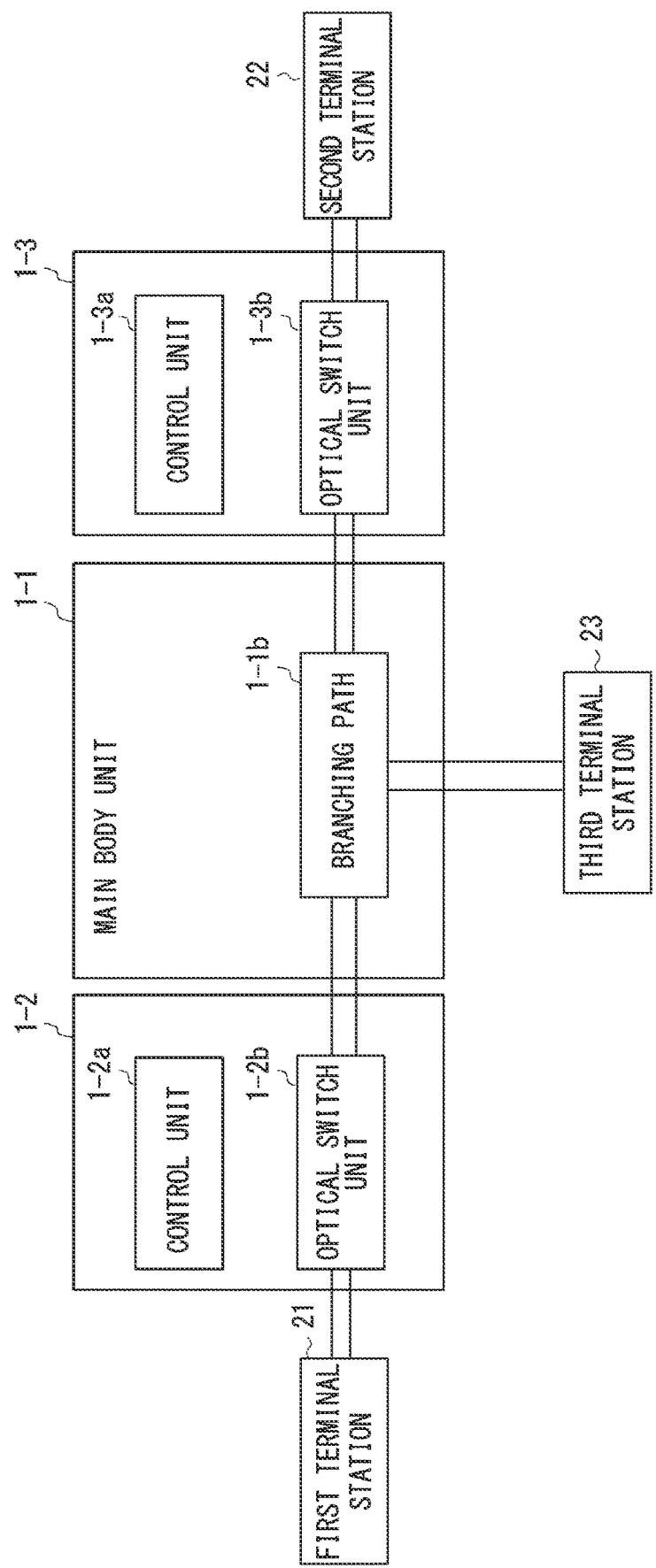
FIG. 14 is a schematic diagram illustrating a configuration example of an optical submarine cable system including an optical submarine branching apparatus according to a fifth example embodiment.

A fifth example embodiment will be described with additional reference to FIG. 14, focusing on differences from the first example embodiment. Note, however, that, to the fifth example embodiment, various examples described in the first to fourth example embodiments can be appropriately applied. FIG. 14 is a schematic diagram illustrating a configuration example of an optical submarine cable system including an optical submarine branching apparatus according to the fifth example embodiment.

As illustrated in FIG. 14, the optical submarine cable system according to the present example embodiment (hereinafter, referred to as the system) can include, as an optical submarine branching apparatus 1 in FIG. 2, a main body unit 1-1, an optical switch unit 1-2b on the first terminal station 21 side, and an optical switch unit 1-3b on the second terminal station 22 side as separate housings. In FIG. 14, an example in which a control unit 1-2a configured to control the optical switch unit 1-2b is included in an apparatus 1-2 that includes a housing including the optical switch unit 1-2b and a control unit 1-3a configured to control the optical switch unit 1-3b is included in an apparatus 1-3 that includes a housing including the optical switch unit 1-3b is illustrated. As described above, the switching unit 1b in FIG. 2 can include a first switching apparatus provided on the first terminal station 21 side as a separate housing from the main body and a second switching apparatus provided on the second terminal station 22 side as a separate housing from the main body and the first switching apparatus. The first switching apparatus is an apparatus exemplified by the apparatus 1-2 including the optical switch unit 1-2b, and the second switching apparatus is an apparatus exemplified by the apparatus 1-3 including the optical switch unit 1-3b.

The main body unit 1-1 can include a control unit 1a and a branching path 1-1b and, in conjunction therewith, include, for example, a circuit or the like for power supply, and can include no selective switching function relating to optical signals. For example, the optical switch unit 1-2b can include an optical switch performing switching of first optical fiber transmission lines, and the optical switch unit 1-3b can include an optical switch performing switching of second optical fiber transmission lines. Note that allocation of switches inside the optical switch unit 1-2b and the optical switch unit 1-3b may be a combination other than the above-described combination and it is only required that necessary optical switches be included anywhere in the combination of the optical switch unit 1-2b and the optical switch unit 1-3b. In addition, the allocation of switches inside the optical switch unit 1-2b and the optical switch unit 1-3b can be concentrated on either thereof, and a configuration in which, for example, either the apparatus 1-2 or the apparatus 1-3 is omitted can be employed.

The optical switch unit 1-2b (and the control unit 1-2a) can also be included in another submarine instrument, such as a repeating apparatus, that is interposed between the first terminal station 21 and the main body unit 1-1. Likewise, the optical switch unit 1-3b (and the control unit 1-3a) can also be included in another submarine instrument, such as a repeating apparatus, that is interposed between the main body unit 1-1 and the second terminal station 22. On the third terminal station 23 side, an optical switch or an optical switch and a control unit can be installed as a separate housing.

Consequently, according to the present example embodiment, it is possible to miniaturize the housing of each unit, such as the main body unit, that constitutes the optical submarine branching apparatus and, in particular, facilitate winding work of optical cables at the time of laying and retrieval of the optical cables, in addition to the advantageous effects of any of the first to fourth example embodiments.

Sixth Example Embodiment

A sixth example embodiment will be described with additional reference to FIGS. 15 to 18, focusing on differences from the second example embodiment. Note, however, that, to the sixth example embodiment, various examples described in the first to fifth example embodiments can be appropriately applied. FIGS. 15 to 18 are schematic diagrams illustrating a configuration example of an optical submarine cable system including an optical submarine branching apparatus according to the sixth example embodiment.

Figure 15:
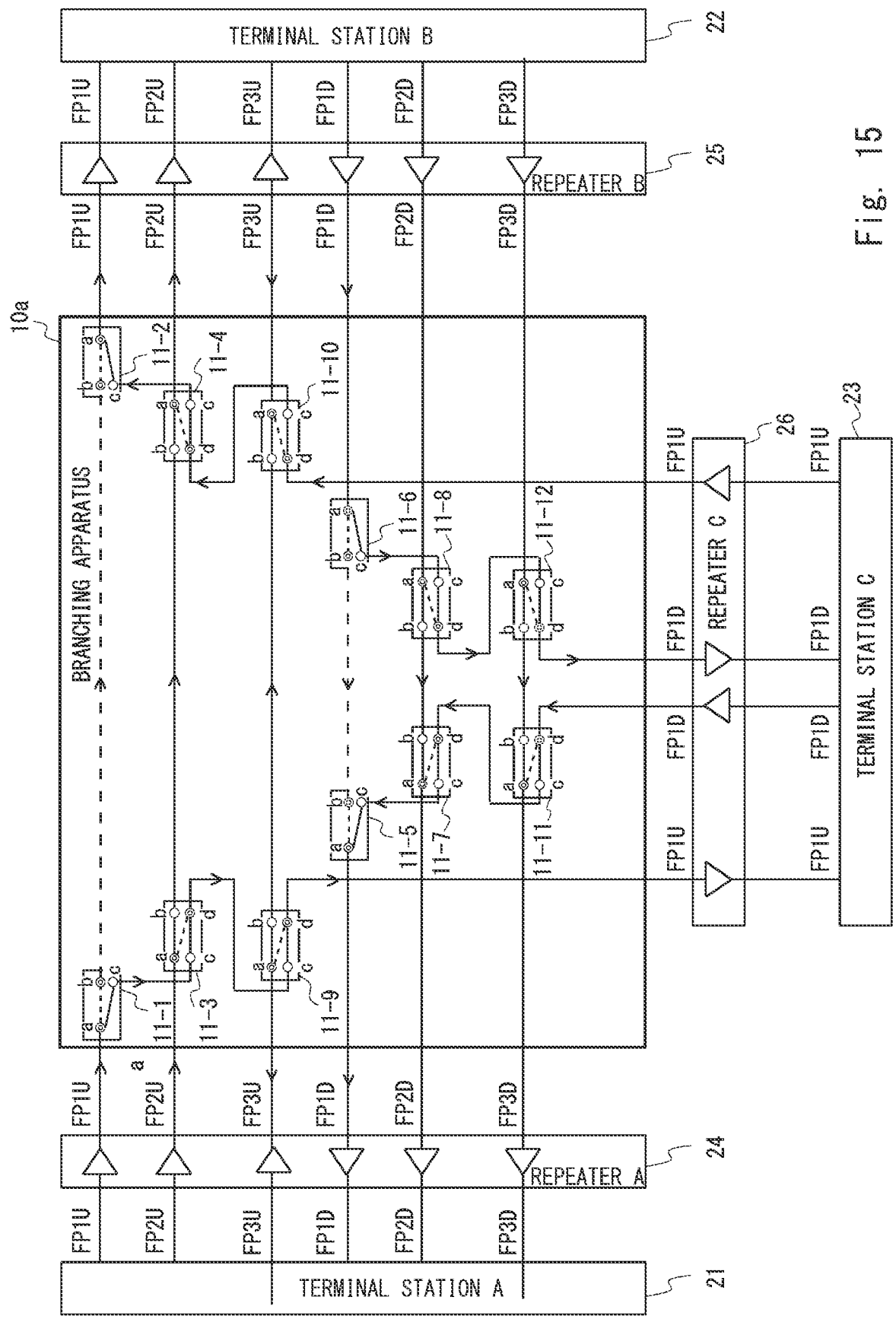
FIG. 15 is a schematic diagram illustrating a configuration example of an optical submarine cable system including an optical submarine branching apparatus according to a sixth example embodiment.

As illustrated in FIG. 15, the optical submarine cable system according to the present example embodiment (hereinafter, referred to as the system) is configured such that a terminal station A (21) and a terminal station B (22) are connected by three first optical fiber transmission lines and three second optical fiber transmission lines and the optical fiber transmission lines are allowed to branch to a terminal station C (23).

As illustrated in FIG. 15, a branching apparatus 10a in the system is a branching apparatus configured by adding optical switches 11-9 to 11-12 to the branching apparatus 10 in FIG. 6. The branching apparatus 10a, with respect to the upstream direction, connects the optical switch 11-9 between a terminal d of an optical switch 11-3 and a repeater C (26) and connects the optical switch 11-10 between a terminal d of an optical switch 11-4 and the repeater C (26). The branching apparatus 10a, with respect to the downstream direction, connects the optical switch 11-12 between a terminal d of an optical switch 11-8 and the repeater C (26) and connects the optical switch 11-11 between a terminal d of an optical switch 11-7 and the repeater C (26).

In the system, although control of the added optical switches needs to be added, the description that was made referring to FIGS. 6 to 8 can basically be applied with respect to switching control of the optical switches, and the switching control will be schematically described with detailed description thereof omitted.

In FIG. 15, the first fiber pair serving as a medium for signals FP1U and FP1D transmitted and received by the terminal station A (21) is connected in such a way that bidirectional communication between the terminal station A (21) and the terminal station C (23) and bidirectional communication between the terminal station C (23) and the terminal station B (22) are performed therethrough. In addition, in FIG. 15, the second fiber pair serving as a medium for signals FP2U and FP2D transmitted and received by the terminal station A (21) is connected in such a way that bidirectional communication between the terminal station A (21) and the terminal station B (22) is performed therethrough. Moreover, in FIG. 15, the third fiber pair serving as a medium for signals FP3U and FP3D transmitted and received by the terminal station A (21) is connected in such a way that bidirectional communication between the terminal station A (21) and the terminal station B (22) is performed therethrough.

Figure 16:
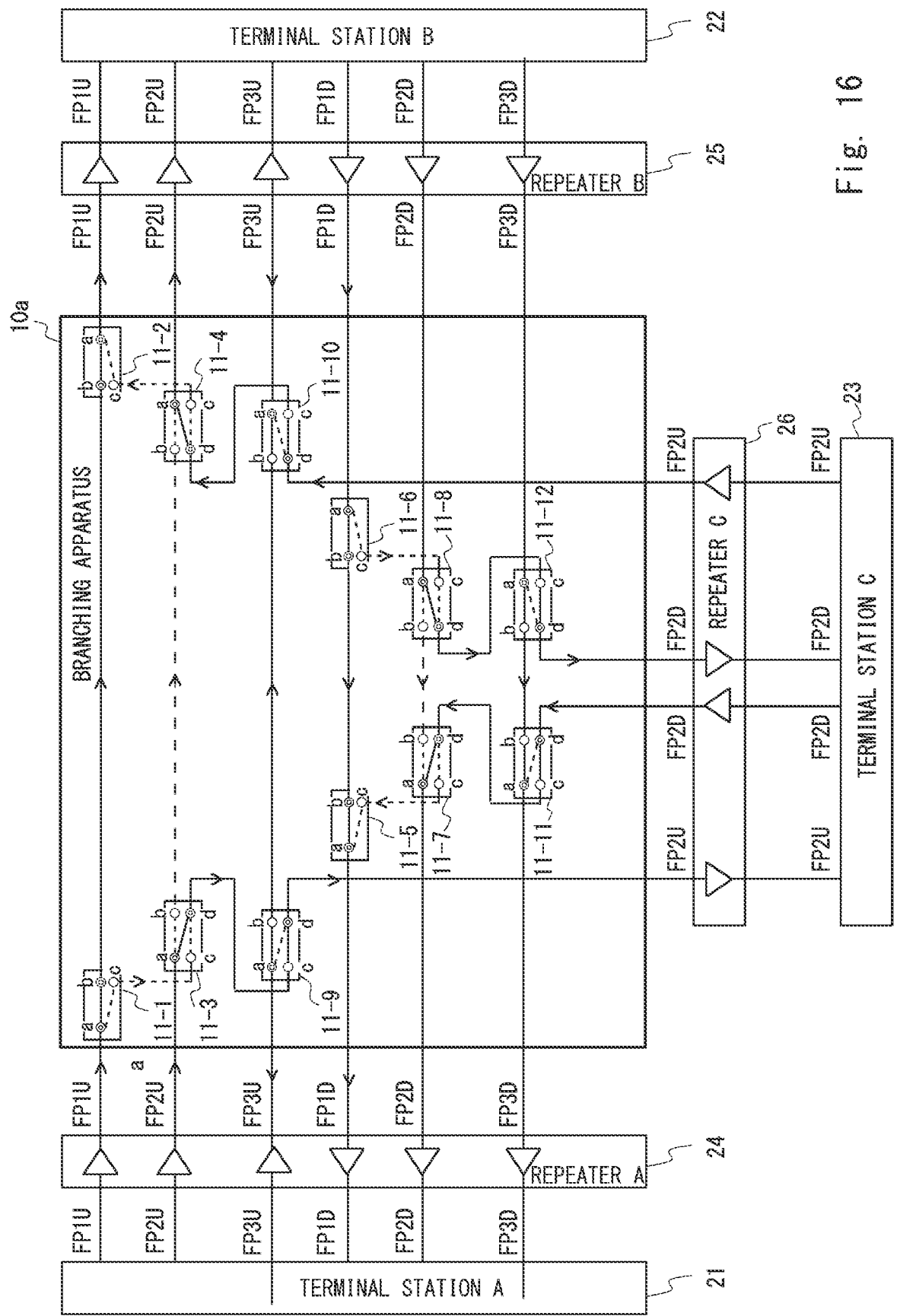
FIG. 16 is a schematic diagram illustrating a configuration example of the optical submarine cable system including the optical submarine branching apparatus according to the sixth example embodiment.
Figure 17:
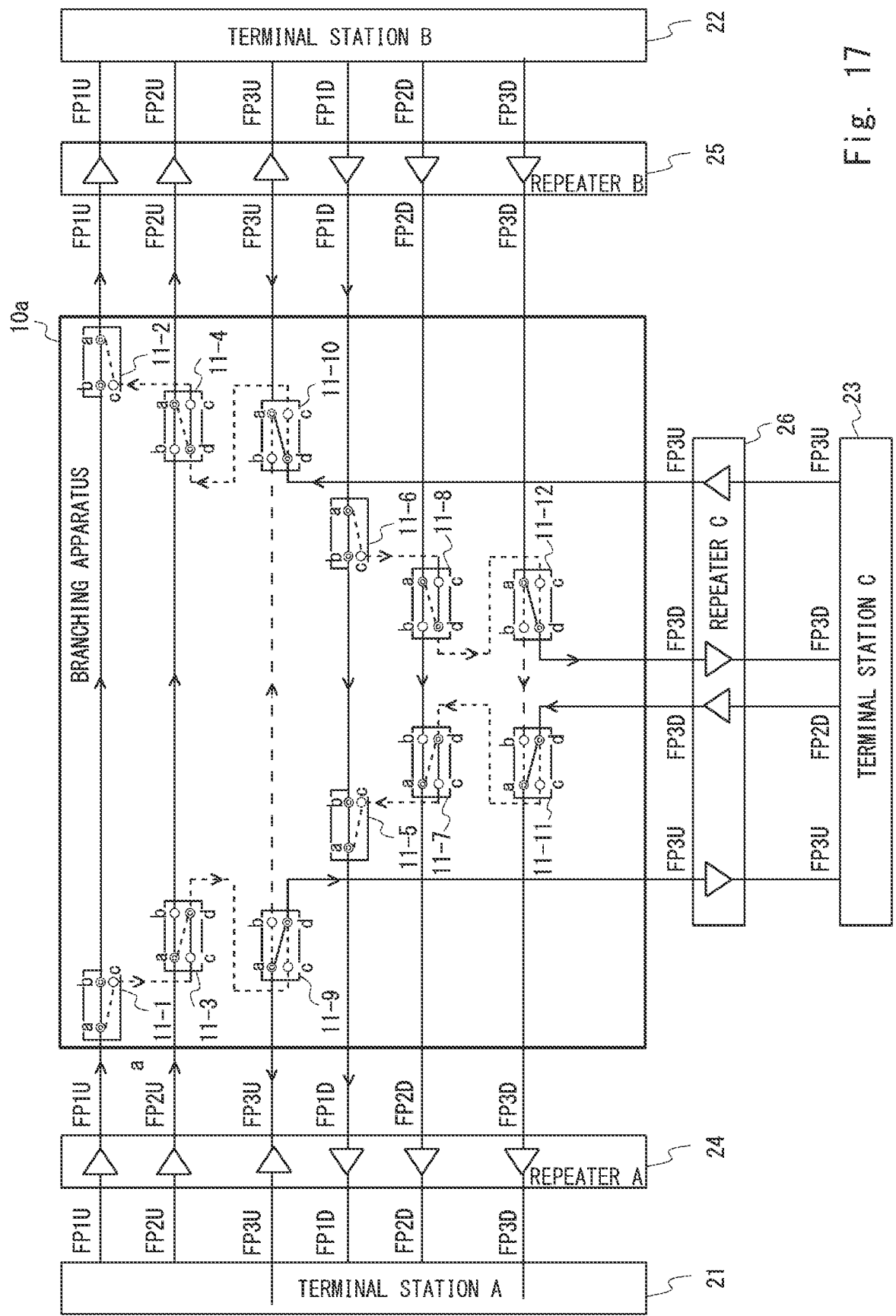
FIG. 17 is a schematic diagram illustrating a configuration example of the optical submarine cable system including the optical submarine branching apparatus according to the sixth example embodiment.
Figure 18:
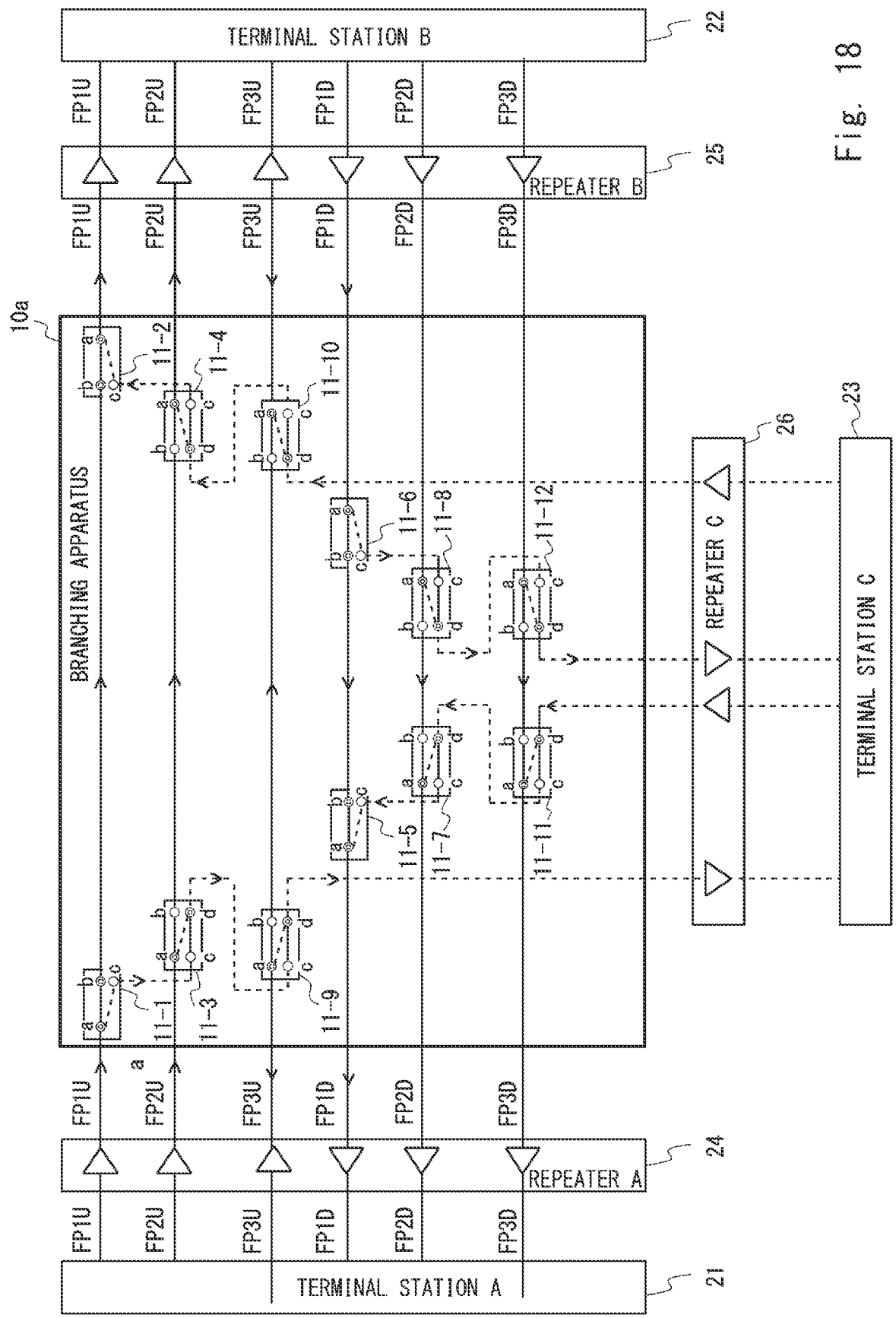
FIG. 18 is a schematic diagram illustrating a configuration example of the optical submarine cable system including the optical submarine branching apparatus according to the sixth example embodiment.

The branching apparatus 10a is capable of selectively switching the connection state illustrated in FIG. 15 to any of connection states illustrated in FIGS. 16 to 18 and restoring the connection state to the original state. In the system, including such switching, any one of the above-described connection states can be selectively switched to another of the connection states.

In the connection state illustrated in FIG. 16, a fiber pair used for connection to the terminal station C (23), differing from the one in the connection state illustrated in FIG. 15, is the second fiber pair. In other words, the connection state illustrated in FIG. 16 is a connection state obtained from the connection state illustrated in FIG. 15 by, with respect to a fiber pair used for connection to the terminal station C (23), replacing the first one with the second one of the fiber pairs.

In FIG. 16, the second fiber pair serving as a medium for the signals FP2U and FP2D transmitted and received by the terminal station A (21) is connected in such a way that bidirectional communication between the terminal station A (21) and the terminal station C (23) and bidirectional communication between the terminal station C (23) and the terminal station B (22) are performed therethrough. In addition, in FIG. 16, the first fiber pair serving as a medium for the signals FP1U and FP1D transmitted and received by the terminal station A (21) is connected in such a way that bidirectional communication between the terminal station A (21) and the terminal station B (22) is performed therethrough. Moreover, in FIG. 16, the third fiber pair serving as a medium for the signals FP3U and FP3D transmitted and received by the terminal station A (21) is connected in such a way that bidirectional communication between the terminal station A (21) and the terminal station B (22) is performed therethrough.

In the connection state illustrated in FIG. 17, a fiber pair used for connection to the terminal station C (23), differing from the one in the connection state illustrated in FIG. 15, is the third fiber pair. In other words, the connection state illustrated in FIG. 17 is a connection state obtained from the connection state illustrated in FIG. 15 by, with respect to a fiber pair used for connection to the terminal station C (23), replacing the first one with the third one of the fiber pairs.

In FIG. 17, the third fiber pair serving as a medium for the signals FP3U and FP3D transmitted and received by the terminal station A (21) is connected in such a way that bidirectional communication between the terminal station A (21) and the terminal station C (23) and bidirectional communication between the terminal station C (23) and the terminal station B (22) are performed therethrough. In addition, in FIG. 17, the first fiber pair serving as a medium for the signals FP1U and FP1D transmitted and received by the terminal station A (21) is connected in such a way that bidirectional communication between the terminal station A (21) and the terminal station B (22) is performed therethrough. Moreover, in FIG. 17, the second fiber pair serving as a medium for signals FP2U and FP2D transmitted and received by the terminal station A (21) is connected in such a way that bidirectional communication between the terminal station A (21) and the terminal station B (22) is performed therethrough.

Although the details are not described, the system can also be put in a connection state in which, for example, the terminal station C (23) and the terminal station B (22) are not connected in the connection states in FIGS. 15 to 17.

The branching apparatus 10a is capable of switching the connection states illustrated in FIGS. 15 to 17 and the like to a connection state illustrated in FIG. 18 and restoring the connection state to the original state. The connection state illustrated in FIG. 18 can be said to be a basic connection state and is a connection state in which connection to the terminal station C (23) using any fiber pair is not established.

In FIG. 18, the first fiber pair serving as a medium for the signals FP1U and FP1D transmitted and received by the terminal station A (21) is connected in such a way that bidirectional communication between the terminal station A (21) and the terminal station B (22) is performed therethrough. In addition, in FIG. 18, the second fiber pair serving as a medium for the signals FP2U and FP2D transmitted and received by the terminal station A (21) is also connected in such a way that bidirectional communication between the terminal station A (21) and the terminal station B (22) is performed therethrough. Moreover, in FIG. 18, the third fiber pair serving as a medium for the signals FP3U and FP3D transmitted and received by the terminal station A (21) is also connected in such a way that bidirectional communication between the terminal station A (21) and the terminal station B (22) is performed therethrough.

Consequently, according to the present example embodiment, it is possible to expand the optical submarine cable system in such a way as to include more transmission lines, in addition to the advantageous effects of any of the first to fifth example embodiments. Although, in the present example embodiment, an example in which three first optical fiber transmission lines and three second optical fiber transmission lines are included was described, it is possible to include four or more first optical fiber transmission lines and the same number of second optical fiber transmission lines as the first optical fiber transmission lines. For example, although the second example embodiment was exemplified by two fiber pairs and the present example embodiment was exemplified by three fiber pairs in FIGS. 15 to 18, the system may include more fiber pairs than these examples.

Seventh Example Embodiment

Figure 19:
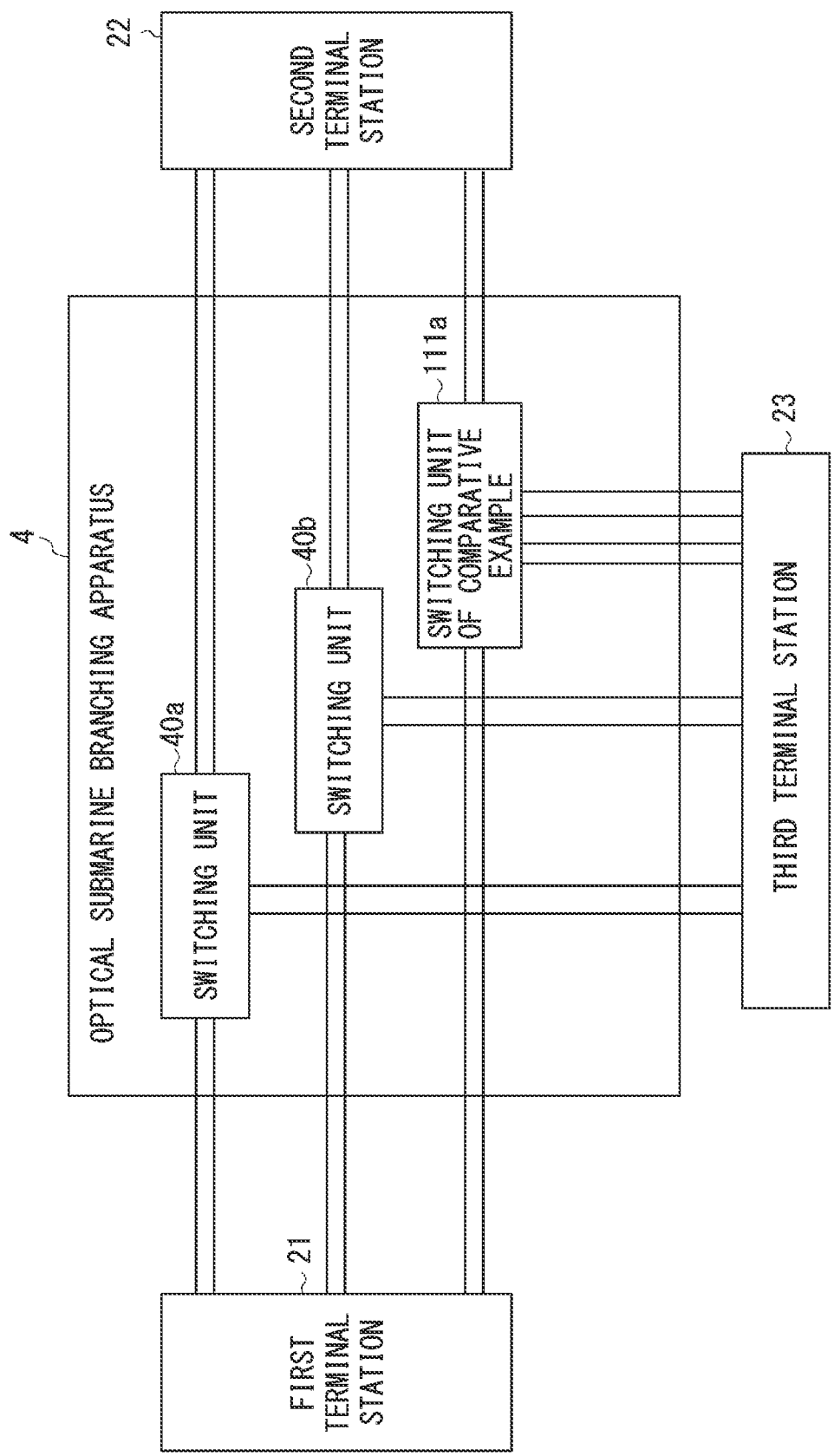
FIG. 19 is a schematic diagram illustrating a configuration example of an optical submarine cable system including an optical submarine branching apparatus according to a seventh example embodiment.

A seventh example embodiment will be described with additional reference to FIG. 19, focusing on differences from the first, second, and fourth example embodiments. Note, however, that, to the seventh example embodiment, various examples described in the first to sixth example embodiments can be appropriately applied. FIG. 19 is a schematic diagram illustrating a configuration example of an optical submarine cable system including an optical submarine branching apparatus according to the seventh example embodiment.

As illustrated in FIG. 19, the optical submarine cable system according to the present example embodiment (hereinafter, referred to as the system) allows a mode in which a branch line is shared as described in the first example embodiment and a mode in which no branch line is shared to coexist. Hereinbelow, description will be made on individual cases categorized by whether or not the sharing is performed.

As illustrated in FIG. 19, an optical submarine branching apparatus 4 can include a switching unit 40a that includes the same configuration as the switching unit 1b in the optical submarine branching apparatus 1 in FIG. 2 and a switching unit 40b that includes the same configuration as the switching unit 40 in the optical submarine branching apparatus 3 in FIG. 14, for providing the sharing mode. The numbers of the switching units 40a and the switching units 40b can be any numbers. The switching unit 40a, for example, allows arbitrary two trunk lines among the trunk lines connected to the optical submarine branching apparatus 4 to share a branch line among the branch lines connected to the optical submarine branching apparatus 4. The switching unit 40b, for example, allows arbitrary two trunk lines among the trunk lines connected to the optical submarine branching apparatus 4 to share two branch lines among the branch lines connected to the optical submarine branching apparatus 4. Note that the number of trunk lines that are allowed to share a branch line(s) by each of the switching units 40a and 40b is not limited to two.

As illustrated in FIG. 19, the optical submarine branching apparatus 4 can include a switching unit (switching unit of a comparative example) 111a that includes the same configuration as the switch group in the branching apparatus 110 of FIG. 10 according to the comparative example, for providing the non-sharing mode. The number of the switching units 111a can be any number. The switching unit 111a, for example, allows arbitrary two trunk lines among the trunk lines connected to the optical submarine branching apparatus 4 to be connected to two branch lines among the branch lines connected to the optical submarine branching apparatus 4 without sharing. In other words, the switching unit 111a allows branching in such a way that, with respect to each trunk line, a branch line corresponding to the trunk line exists. Note that some functions or all the functions of control units can be configured to be the same as one another among the switching units 40a, 40b, and 111a.

Consequently, according to the present example embodiment, it is possible to construct an optical submarine cable system while appropriately selecting required apparatuses according to cost, installation timing, and the like, in addition to the advantageous effects of any of the first to sixth example embodiments.

Other Example Embodiments

Although, in the above-described example embodiments, the functions of the respective units in the optical submarine branching apparatus and the optical submarine cable system were described, such functions are only required to be achieved as an optical submarine branching apparatus or an optical submarine cable system. Although, in the above-described example embodiments, configurations of the optical submarine cable system were exemplified, the configurations are not limited to the exemplifications. Various examples described in the example embodiments can be appropriately combined.

Figure 20:
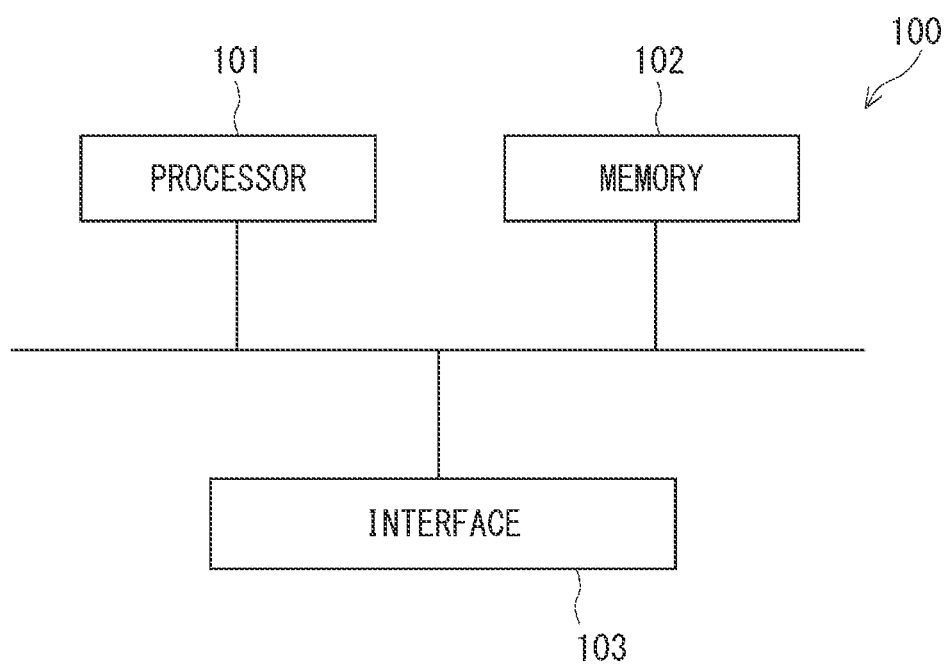
FIG. 20 is a diagram illustrating an example of a hardware configuration of a portion of each of the optical submarine branching apparatuses.

The optical submarine branching apparatuses according to the example embodiments can include the following hardware configuration. FIG. 20 is a diagram illustrating an example of a hardware configuration of a portion of each of the optical submarine branching apparatuses according to the example embodiments.

An optical submarine branching apparatus 100 illustrated in FIG. 20 includes a processor 101, a memory 102, and an interface 103. The interface 103 can be configured as an interface to a not-illustrated switching unit, such as an optical switch. The functions of the respective units described in the example embodiments can be achieved by the processor 101 reading a program stored in the memory 102 and executing the program in collaboration with the interface 103. The program can serve as the programs described in the example embodiments.

In the above-described example, the program can be stored using various types of non-transitory computer readable media and provided to the computer. The non-transitory computer readable media include various types of tangible storage media. Examples of the non-transitory computer readable medium include a magnetic recording medium (such as a flexible disk, a magnetic tape, and a hard disk drive) and an optical magnetic recording medium (such as a magneto-optical disk). The examples further include a CD-read only memory (ROM), a CD-R, and a CD-R/W. The examples still further include a semiconductor memory (such as a mask ROM, a programmable ROM (PROM), an erasable PROM (EPROM), a flash ROM, and a random access memory (RAM)). The above-described program may be supplied to the computer by means of various types of transitory computer readable media. Examples of the transitory computer readable medium include an electrical signal, an optical signal, and an electromagnetic wave. The transitory computer readable medium can supply the program to the computer via a wired communication line, such as an electric wire and an optical fiber, or a wireless communication line.

Note that the present disclosure is not limited to the above-described various example embodiments and can be changed appropriately without departing from the spirit and scope of the present invention. The present disclosure may also be carried out by arbitrarily combining respective example embodiments.

All or part of the example embodiments described above may be described as in the following supplementary notes, but the present invention is not limited thereto.

Supplementary Notes (Supplementary Note 1)
An optical submarine branching apparatus comprising:
switching unit configured to connect to a plurality of first optical fiber transmission lines connecting to a first terminal station, a plurality of second optical fiber transmission lines connecting to a second terminal station, and a third optical fiber transmission line connecting to a third terminal station and to switch a transmission route of a wavelength-multiplexed optical signal; and
control unit configured to control switching of the transmission route by the switching unit,
wherein the switching unit includes a function of connecting each of the plurality of first optical fiber transmission lines to one of the plurality of second optical fiber transmission lines and a function of switching any one of the plurality of first optical fiber transmission lines to connect to the third optical fiber transmission line.

(Supplementary Note 2)
The optical submarine branching apparatus according to Supplementary Note 1, wherein the switching unit includes a configuration in which a first optical switch including an input path and two output paths and a second optical switch including two input paths and two output paths are connected in multi-stages.

(Supplementary Note 3)
The optical submarine branching apparatus according to Supplementary Note 1, wherein the switching unit includes a function of switching any one of the plurality of second optical fiber transmission lines to connect to the third optical fiber transmission line.

(Supplementary Note 4)
The optical submarine branching apparatus according to Supplementary Note 3, wherein the switching unit includes a configuration in which a second optical switch including two input paths and two output paths and a third optical switch including two input paths and an output path are connected in multi-stages.

(Supplementary Note 5)
The optical submarine branching apparatus according to Supplementary Note 3, wherein the switching unit includes a configuration in which a first optical switch including an input path and two output paths, a second optical switch including two input paths and two output paths, and a third optical switch including two input paths and an output path are connected in multi-stages.

(Supplementary Note 6)
The optical submarine branching apparatus according to any one of Supplementary Notes 1 to 5, wherein each optical fiber transmission line in the plurality of first optical fiber transmission lines, the plurality of second optical fiber transmission lines, and the third optical fiber transmission line includes a fiber pair composed of an optical fiber for optically transmitting information from the first terminal station side and an optical fiber for optically transmitting information to the first terminal station side.

(Supplementary Note 7)

The optical submarine branching apparatus according to any one of Supplementary Notes 1 to 6, wherein control of the switching unit by the control unit is performed based on a control signal extractable from a wavelength-multiplexed optical signal having been optically transmitted through at least two or more optical fiber transmission lines out of respective optical fiber transmission lines of the plurality of first optical fiber transmission lines, the plurality of second optical fiber transmission lines, and the third optical fiber transmission line.

(Supplementary Note 8)

The optical submarine branching apparatus according to any one of Supplementary Notes 1 to 7, wherein, in the third optical fiber transmission line, a submarine apparatus is connected between the optical submarine branching apparatus and the third terminal station, the submarine apparatus being an apparatus for submarine installation.

(Supplementary Note 9)

The optical submarine branching apparatus according to Supplementary Note 8, wherein the submarine apparatus is a multiplexing/demultiplexing apparatus including a function of selecting a wavelength to be output to a succeeding stage.

(Supplementary Note 10)

The optical submarine branching apparatus according to Supplementary Note 8, wherein, to the third optical fiber transmission line, a multiplexing/demultiplexing apparatus including a function of selecting a wavelength to be output to a succeeding stage and a repeating apparatus arranged on the third terminal station side of the multiplexing/demultiplexing apparatus are connected as the submarine apparatuses.

(Supplementary Note 11)

The optical submarine branching apparatus according to any one of Supplementary Notes 1 to 10, wherein
the switching unit
is further connected to a fourth optical fiber transmission line connected to the third terminal station and
includes a function of switching any one of the plurality of first optical fiber transmission lines to connect to the fourth optical fiber transmission line.

(Supplementary Note 12)

The optical submarine branching apparatus according to any one of Supplementary Notes 1 to 11, wherein the switching unit includes a first switching apparatus, the first switching apparatus being provided on the first terminal station side as a separate housing from a main body of the optical submarine branching apparatus, and a second switching apparatus, the second switching apparatus being provided on the second terminal station side as a separate housing from the main body of the optical submarine branching apparatus and the first switching apparatus.

(Supplementary Note 13)

An optical submarine cable system comprising:
a first terminal station;
a second terminal station;
a third terminal station;
an optical submarine branching apparatus;
a plurality of first optical fiber transmission lines configured to connect the optical submarine branching apparatus to the first terminal station;
a plurality of second optical fiber transmission lines configured to connect the optical submarine branching apparatus to the second terminal station; and
a third optical fiber transmission line configured to connect the optical submarine branching apparatus to the third terminal station, wherein
the optical submarine branching apparatus includes:
switching unit configured to connect to the plurality of first optical fiber transmission lines, the plurality of second optical fiber transmission lines, and the third optical fiber transmission line and to switch a transmission route of a wavelength-multiplexed optical signal; and
control unit configured to control switching of the transmission route by the switching unit, and
the switching unit includes a function of connecting each of the plurality of first optical fiber transmission lines to one of the plurality of second optical fiber transmission lines and a function of switching any one of the plurality of first optical fiber transmission lines to connect to the third optical fiber transmission line.

(Supplementary Note 14)

The optical submarine cable system according to Supplementary Note 13, wherein the switching unit includes a configuration in which a first optical switch including an input path and two output paths and a second optical switch including two input paths and two output paths are connected in multi-stages.

(Supplementary Note 15)

The optical submarine cable system according to Supplementary Note 13, wherein the switching unit includes a function of switching any one of the plurality of second optical fiber transmission lines to connect to the third optical fiber transmission line.

(Supplementary Note 16)

The optical submarine cable system according to Supplementary Note 15, wherein the switching unit includes a configuration in which a second optical switch including two input paths and two output paths and a third optical switch including two input paths and an output path are connected in multi-stages.

(Supplementary Note 17)

The optical submarine cable system according to Supplementary Note 15, wherein the switching unit includes a configuration in which a first optical switch including an input path and two output paths, a second optical switch including two input paths and two output paths, and a third optical switch including two input paths and an output path are connected in multi-stages.

(Supplementary Note 18)

The optical submarine cable system according to any one of Supplementary Notes 13 to 17, wherein each optical fiber transmission line in the plurality of first optical fiber transmission lines, the plurality of second optical fiber transmission lines, and the third optical fiber transmission line includes a fiber pair composed of an optical fiber for optically transmitting information from the first terminal station side and an optical fiber for optically transmitting information to the first terminal station side.

(Supplementary Note 19)

The optical submarine cable system according to any one of Supplementary Notes 13 to 18, wherein control of the switching unit by the control unit is performed based on a control signal extractable from a wavelength-multiplexed optical signal having been optically transmitted through at least two or more optical fiber transmission lines out of respective optical fiber transmission lines of the plurality of first optical fiber transmission lines, the plurality of second optical fiber transmission lines, and the third optical fiber transmission line.

(Supplementary Note 20)

The optical submarine cable system according to any one of Supplementary Notes 13 to 19 comprising a submarine apparatus, the submarine apparatus being an apparatus for submarine installation and being connected between the optical submarine branching apparatus and the third terminal station in the third optical fiber transmission line.

(Supplementary Note 21)

The optical submarine cable system according to Supplementary Note 20, wherein the submarine apparatus is a multiplexing/demultiplexing apparatus including a function of selecting a wavelength to be output to a succeeding stage.

(Supplementary Note 22)

The optical submarine cable system according to Supplementary Note 20 comprising a multiplexing/demultiplexing apparatus including a function of selecting a wavelength to be output to a succeeding stage and a repeating apparatus connected on the third terminal station side of the multiplexing/demultiplexing apparatus, as the submarine apparatuses connected to the third optical fiber transmission line.

(Supplementary Note 23)

The optical submarine cable system according to any one of Supplementary Notes 13 to 22, wherein the switching unit is further connected to a fourth optical fiber transmission line connected to the third terminal station and includes a function of switching any one of the plurality of first optical fiber transmission lines to connect to the fourth optical fiber transmission line.

(Supplementary Note 24)

The optical submarine cable system according to any one of Supplementary Notes 13 to 23, wherein the switching unit includes a first switching apparatus, the first switching apparatus being provided on the first terminal station side as a separate housing from a main body of the optical submarine branching apparatus, and a second switching apparatus, the second switching apparatus being provided on the second terminal station side as a separate housing from the main body of the optical submarine branching apparatus and the first switching apparatus.

(Supplementary Note 25)

A switching method comprising a control step of controlling switching unit in an optical submarine branching apparatus, the switching unit being connected to a plurality of first optical fiber transmission lines connecting the optical submarine branching apparatus to a first terminal station, a plurality of second optical fiber transmission lines connecting the optical submarine branching apparatus to a second terminal station, and a third optical fiber transmission line connecting the optical submarine branching apparatus to a third terminal station, to switch a transmission route of a wavelength-multiplexed optical signal, wherein the control step includes a step of connecting each of the plurality of first optical fiber transmission lines to one of the plurality of second optical fiber transmission lines and a step of switching any one of the plurality of first optical fiber transmission lines to connect to the third optical fiber transmission line.

(Supplementary Note 26)

The switching method according to Supplementary Note 25, wherein the switching unit includes a configuration in which a first optical switch including an input path and two output paths and a second optical switch including two input paths and two output paths are connected in multi-stages, and the control step switches the transmission route by controlling the first optical switch and the second optical switch.

(Supplementary Note 27)

The switching method according to Supplementary Note 25, wherein the control step includes a step of switching any one of the plurality of second optical fiber transmission lines to connect to the third optical fiber transmission line.

(Supplementary Note 28)

The switching method according to Supplementary Note 27, wherein the switching unit includes a configuration in which a second optical switch including two input paths and two output paths and a third optical switch including two input paths and an output path are connected in multi-stages, and the control step switches the transmission route by controlling the second optical switch and the third optical switch.

(Supplementary Note 29)

The switching method according to Supplementary Note 27, wherein the switching unit includes a configuration in which a first optical switch including an input path and two output paths, a second optical switch including two input paths and two output paths, and a third optical switch including two input paths and an output path are connected in multi-stages, and the control step switches the transmission route by controlling the first optical switch, the second optical switch, and the third optical switch.

(Supplementary Note 30)

The switching method according to any one of Supplementary Notes 25 to 29, wherein each optical fiber transmission line in the plurality of first optical fiber transmission lines, the plurality of second optical fiber transmission lines, and the third optical fiber transmission line includes a fiber pair composed of an optical fiber for optically transmitting information from the first terminal station side and an optical fiber for optically transmitting information to the first terminal station side.

(Supplementary Note 31)

The switching method according to any one of Supplementary Notes 25 to 30, wherein the control step is performed based on a control signal extractable from a wavelength-multiplexed optical signal having been optically transmitted through at least two or more optical fiber transmission lines out of respective optical fiber transmission lines of the plurality of first optical fiber transmission lines, the plurality of second optical fiber transmission lines, and the third optical fiber transmission line.

(Supplementary Note 32)

The switching method according to any one of Supplementary Notes 25 to 31, wherein, in the third optical fiber transmission line, a submarine apparatus is connected between the optical submarine branching apparatus and the third terminal station, the submarine apparatus being an apparatus for submarine installation.

(Supplementary Note 33)

The switching method according to Supplementary Note 32, wherein the submarine apparatus is a multiplexing/demultiplexing apparatus including a function of selecting a wavelength to be output to a succeeding stage.

(Supplementary Note 34)

The switching method according to Supplementary Note 32, wherein, to the third optical fiber transmission line, a multiplexing/demultiplexing apparatus including a function of selecting a wavelength to be output to a succeeding stage and a repeating apparatus arranged on the third terminal station side of the multiplexing/demultiplexing apparatus are connected as the submarine apparatuses.
(Supplementary Note 35)
The switching method according to any one of Supplementary Notes 25 to 34, wherein
the switching unit is further connected to a fourth optical fiber transmission line connected to the third terminal station, and
the control step includes a step of switching any one of the plurality of first optical fiber transmission lines to connect to the fourth optical fiber transmission line.
(Supplementary Note 36)
The switching method according to any one of Supplementary Notes 25 to 35, wherein the switching unit includes a first switching apparatus, the first switching apparatus being provided on the first terminal station side as a separate housing from a main body of the optical submarine branching apparatus, and a second switching apparatus, the second switching apparatus being provided on the second terminal station side as a separate housing from the main body of the optical submarine branching apparatus and the first switching apparatus.
(Supplementary Note 37)
A program to be executed by a control computer included in an optical submarine branching apparatus,
the program being a program causing a control step of controlling switching unit in an optical submarine branching apparatus, the switching unit being connected to a plurality of first optical fiber transmission lines connecting the optical submarine branching apparatus to a first terminal station, a plurality of second optical fiber transmission lines connecting the optical submarine branching apparatus to a second terminal station, and a third optical fiber transmission line connecting the optical submarine branching apparatus to a third terminal station, to switch a transmission route of a wavelength-multiplexed optical signal to be executed,
wherein the control step includes a step of connecting each of the plurality of first optical fiber transmission lines to one of the plurality of second optical fiber transmission lines and a step of switching any one of the plurality of first optical fiber transmission lines to connect to the third optical fiber transmission line.

The claimed invention was described above with reference to example embodiments thereof, but the claimed invention is not limited to the above example embodiments. Various modifications that could be understood by a person skilled in the art may be applied to the configurations and details of the claimed invention within the scope of the present invention.

This application is based upon and claims the benefit of priority from Japanese patent application No. 2019-061901, filed on Mar. 27, 2019, the disclosure of which is incorporated herein in its entirety by reference.

REFERENCE SIGNS LIST 1, 3, 4, 100 Optical submarine branching apparatus
1-1 Main body unit
1-2, 1-3 Apparatus
1-2b, 1-3b Optical switch unit
1-1b Branching path
1a, 1-2a, 1-3a, 3a Control unit
1b, 3b, 40, 40a, 40b Switching unit
10, 10a Branching apparatus
11 Switch group
11-1 to 11-12, 41, 42, 43 Optical switch
11 Optical switch group
12 Extraction unit
21 First terminal station (terminal station A)
22 Second terminal station (terminal station B)
23 Third terminal station (terminal station C)
27 Multiplexing/demultiplexing apparatus
28-1, 28-2 WSS
30 Optical transmission apparatus
31 Optical transmitter
32 Multiplexing unit
33 Control signal generation unit
101 Processor
102 Memory
103 Interface
111a Switching unit of a comparative example

What is claimed is:

1. An optical submarine branching apparatus comprising:
switching unit configured to connect to a plurality of first optical fiber transmission lines connecting to a first terminal station, a plurality of second optical fiber transmission lines connecting to a second terminal station, and a third optical fiber transmission line connecting to a third terminal station and to switch a transmission route of a wavelength-multiplexed optical signal; and
control unit configured to control switching of the transmission route by the switching unit,
wherein the switching unit is configured to connect each of the plurality of first optical fiber transmission lines to a preset one of the plurality of second optical fiber transmission lines and of switching any one of the plurality of first optical fiber transmission lines to connect to the third optical fiber transmission line,
wherein each optical fiber transmission line in the plurality of first optical fiber transmission lines, the plurality of second optical fiber transmission lines, and the third optical fiber transmission line includes a fiber pair comprising an optical fiber for optically transmitting information from the first terminal station side and an optical fiber for optically transmitting information to the first terminal station side, and
wherein the switching unit includes a configuration in which a first optical switch including an input path and two output paths and a second optical switch including two input paths and two output paths are connected in multi-stages, and the first optical switch and the second optical switch connected in the multi-stages each have a different one of the first optical fiber transmissions lines as an input.

2. The optical submarine branching apparatus according to claim 1, wherein control of the switching unit by the control unit is performed based on a control signal extractable from a wavelength-multiplexed optical signal having been optically transmitted through at least two or more optical fiber transmission lines out of respective optical fiber transmission lines of the plurality of first optical fiber transmission lines, the plurality of second optical fiber transmission lines, and the third optical fiber transmission line.

3. The optical submarine branching apparatus according to claim 1, wherein, in the third optical fiber transmission line, a submarine apparatus is connected between the optical submarine branching apparatus and the third terminal station, the submarine apparatus being an apparatus for submarine installation.

4. The optical submarine branching apparatus according to claim 3, wherein the submarine apparatus is a multiplexing/demultiplexing apparatus being configured to select a wavelength to be output to a succeeding stage.

5. The optical submarine branching apparatus according to claim 3, wherein, to the third optical fiber transmission line, a multiplexing/demultiplexing apparatus being configured to select a wavelength to be output to a succeeding stage and a repeating apparatus arranged on the third terminal station side of the multiplexing/demultiplexing apparatus are connected as the submarine apparatuses.

6. The optical submarine branching apparatus according to claim 1, wherein the switching unit is further connected to a fourth optical fiber transmission line connected to the third terminal station and is configured to switch any one of the plurality of first optical fiber transmission lines to connect to the fourth optical fiber transmission line.

7. The optical submarine branching apparatus according to claim 1, wherein the switching unit includes a first switching apparatus, the first switching apparatus being provided on the first terminal station side as a separate housing from a main body of the optical submarine branching apparatus, and a second switching apparatus, the second switching apparatus being provided on the second terminal station side as a separate housing from the main body of the optical submarine branching apparatus and the first switching apparatus.

8. An optical submarine cable system comprising:
a first terminal station;
a second terminal station;
a third terminal station; and
an optical submarine branching apparatus according to claim 1.

9. The optical submarine cable system according to claim 8 comprising a submarine apparatus, the submarine apparatus being an apparatus for submarine installation and being connected between the optical submarine branching apparatus and the third terminal station in the third optical fiber transmission line.

10. The optical submarine cable system according to claim 9, wherein the submarine apparatus is a multiplexing/demultiplexing apparatus being configured to select a wavelength to be output to a succeeding stage.

11. The optical submarine cable system according to claim 9 comprising a multiplexing/demultiplexing apparatus being configured to select a wavelength to be output to a succeeding stage and a repeating apparatus connected on the third terminal station side of the multiplexing/demultiplexing apparatus, as the submarine apparatuses connected to the third optical fiber transmission line.

12. The optical submarine cable system according to claim 8, wherein the switching unit is further connected to a fourth optical fiber transmission line connected to the third terminal station and is configured to switch any one of the plurality of first optical fiber transmission lines to connect to the fourth optical fiber transmission line.

13. The optical submarine cable system according to claim 8, wherein the switching unit includes a first switching apparatus, the first switching apparatus being provided on the first terminal station side as a separate housing from a main body of the optical submarine branching apparatus, and a second switching apparatus, the second switching apparatus being provided on the second terminal station side as a separate housing from the main body of the optical submarine branching apparatus and the first switching apparatus.

14. A switching method comprising
controlling switching unit in an optical submarine branching apparatus, the switching unit being connected to a plurality of first optical fiber transmission lines connecting the optical submarine branching apparatus to a first terminal station, a plurality of second optical fiber transmission lines connecting the optical submarine branching apparatus to a second terminal station, and a third optical fiber transmission line connecting the optical submarine branching apparatus to a third terminal station, to switch a transmission route of a wavelength-multiplexed optical signal,
wherein the controlling includes connecting each of the plurality of first optical fiber transmission lines to a preset one of the plurality of second optical fiber transmission lines and a switching any one of the plurality of first optical fiber transmission lines to connect to the third optical fiber transmission line,
wherein each optical fiber transmission line in the plurality of first optical fiber transmission lines, the plurality of second optical fiber transmission lines, and the third optical fiber transmission line includes a fiber pair comprising an optical fiber for optically transmitting information from the first terminal station side and an optical fiber for optically transmitting information to the first terminal station side, and
wherein the switching unit includes a configuration in which a first optical switch including an input path and two output paths and a second optical switch including two input paths and two output paths are connected in multi-stages, and the first optical switch and the second optical switch connected in the multi-stages each have a different one of the first optical fiber transmission lines as an input.

15. A non-transitory computer-readable medium storing a program which, if executed by a computer, implements operations comprising:
controlling a switching unit in an optical submarine branching apparatus, the switching unit being connected to a plurality of first optical fiber transmission lines connecting the optical submarine branching apparatus to a first terminal station, a plurality of second optical fiber transmission lines connecting the optical submarine branching apparatus to a second terminal station, and a third optical fiber transmission line connecting the optical submarine branching apparatus to a third terminal station, to switch a transmission route of a wavelength-multiplexed optical signal to be executed,
wherein the controlling includes connecting each of the plurality of first optical fiber transmission lines to a preset one of the plurality of second optical fiber transmission lines and switching any one of the plurality of first optical fiber transmission lines to connect to the third optical fiber transmission line,
wherein each optical fiber transmission line in the plurality of first optical fiber transmission lines, the plurality of second optical fiber transmission lines, and the third optical fiber transmission line includes a fiber pair comprising an optical fiber for optically transmitting information from the first terminal station side and an optical fiber for optically transmitting information to the first terminal station side, and
wherein the switching unit includes a configuration in which a first optical switch including an input path and two output paths and a second optical switch including two input paths and two output paths are connected in multi-stages, and the first optical switch and the second optical switch connected in the multi-stages each have a different one of the first optical fiber transmission lines as an input.

* * * * *